(12) United States Patent
Sakurai et al.

(10) Patent No.: US 6,600,930 B1
(45) Date of Patent: Jul. 29, 2003

(54) INFORMATION PROVISION SYSTEM, INFORMATION REGENERATION TERMINAL, AND SERVER

(75) Inventors: Hiroshi Sakurai, Tokyo (JP); Fumihiko Yoshii, Tokyo (JP); Yasuhiro Terayama, Tokyo (JP); Yoshitaka Ukita, Tokyo (JP); Takashi Morita, Saitama (JP); Koichi Hayasaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/112,278

(22) Filed: Jul. 9, 1998

(30) Foreign Application Priority Data

| Jul. 11, 1997 | (JP) | ............................................. 9-186142 |
| Jul. 16, 1997 | (JP) | ............................................. 9-191028 |
| Aug. 15, 1997 | (JP) | ............................................. 9-220325 |

(51) Int. Cl.[7] .................................................. H04B 1/38
(52) U.S. Cl. ........................................ 455/552; 455/426
(58) Field of Search ............................... 455/412, 422, 455/426, 445, 552, 566

(56) References Cited

U.S. PATENT DOCUMENTS 5,809,415 A * 9/1998 Rossmann .................. 455/422
6,104,924 A * 8/2000 Shirai ........................ 455/418

* cited by examiner

Primary Examiner—Lee Nguyen
(74) Attorney, Agent, or Firm—Jay H. Maioli

(57) ABSTRACT

An information communication system includes a portable radiocommunication terminal, an information provision system in which various provided information can be readily acquired, and a server. The server and a plurality of portable radiocommunication terminals are connected via a network by a wireless connection. Send information and receive information are communicated between the terminal and the server according to a predetermined protocol and a predetermined communication data format respectively suitable for the network and independent of an established communication system. When a user of the terminal performs an operation for calling specifying a party according to the established communication system, the server receives send information including a request for calling and executes processing for information communication suitable for the established communication system. Data addressed to each terminal is received by the server and stored in the storage means of the server. Each terminal acquires desired receive by requesting the server for the data.

22 Claims, 19 Drawing Sheets

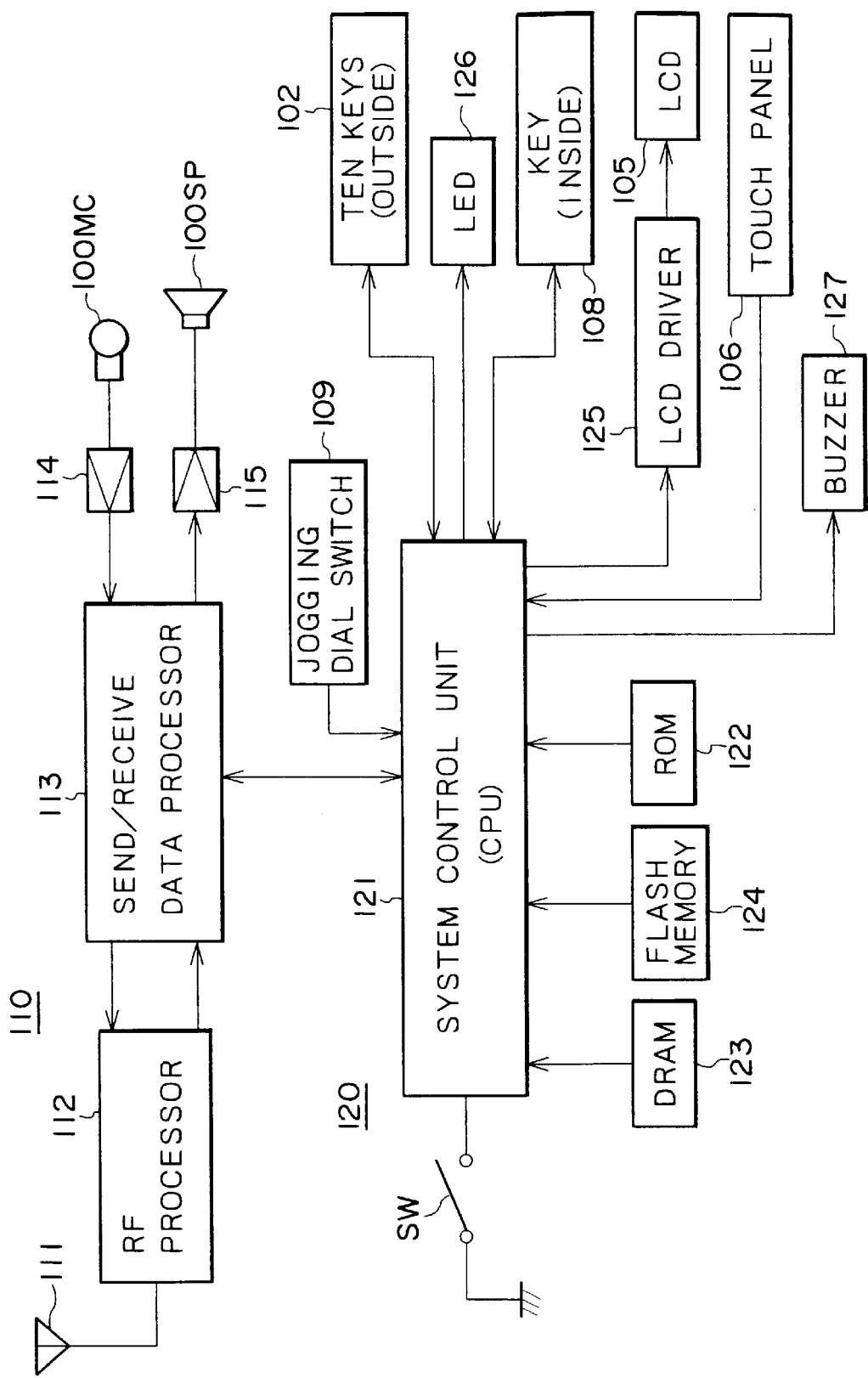

FIG.19

MEMBER INFORMATION TABLE

| MEMBER IDENTIFICAT- ION INFORMATION | CATEGORY | MUSIC INFORMATION COMPRESSED PATTERN | DESPLAY SIZE | COLOR/ MONOCHROME |
|---|---|---|---|---|
| ×××××× | 0 (FOR MUSIC) | A (PATTERN A) | — | — |
| ×××××× | 1 (FOR VIDEO) | B (PATTERN B) | A (LARGE) | C (COLOR) |
| ×××××× | 2 (FOR INFORMATION) | B (PATTERN B) | B (SMALL) | BW (MONOCHROME) |
| ·········· | ·········· | ·········· | ·········· | ·········· |

INFORMATION PROVISION SYSTEM, INFORMATION REGENERATION TERMINAL, AND SERVER

BACKGROUND OF THE INVENTION

1. Field of the Invention

The present invention relates to an information provision system for providing information such as guide information and geographical information to users by means of display and others if a user makes a request and an information regenerator used for the above system.

The present invention also relates to a method and a system of data communication such as facsimile communication and electronic mail using a mobile radiocommunication network for Japanese personal handyphone system (PHS) and mobile telephone for example, a communication terminal and a server used for the above system.

2. Description of the Related Art

A portable information processing display terminal such as an electronic notebook is widely popularized. As for such an information processing display terminal, a user can utilize provided information at necessary time and in a necessary place because various provided information is stored in an internal memory. However, as such an information processing display terminal is portable, a mass memory cannot be provided as to an internal memory and the quantity of providable information is limited. As provided information cannot be updated without rewriting contents stored in a memory or without replacing memories, it is difficult to acquire the latest information.

The former problem of the capacity of memory can be improved to some extent by storing provided information in a card according to PC Card Standard for example, providing a card reader to a portable information processing display terminal and exchanging cards. However, in this case, a user is required to buy plural cards in which various information including information low in a frequency is stored and a user is economically burdened. In addition, to acquire the latest information, a user is required to buy a card in which new information is stored and bears an economic burden.

In the meantime, recently various information provided to the Internet is often acquired by a personal computer via a modem and is often regenerated on the screen of a display or via a speaker. If a personal computer has only to have a memory area in which extracted information can be stored in case information provided to the Internet is utilized, a personal computer can utilize information, the personal computer can utilize information and a terminal itself is not required to have a mass memory.

A portable information processing display terminal to which a modem and data communication facility are added and which can acquire information provided to the Internet in view of the advantages of utilizing information provided to the Internet is also provided.

If information provision service via the Internet is demanded, generally, a user of a personal computer and a portable information processing display terminal makes a contract of information provision service with a specific Internet service provider (hereinafter called ISP). When the above user receives actual information provision service, he/she can receive providable information from an ISP server by accessing to ISP under the above contract so as to connect ISP and his/her own terminal and requesting the provision of information.

In this case, information which individual ISP can provide is limited to information which ISP collects from the provider of contents who subscribes to the network of the ISP and with which ISP itself is provided. Therefore, when information which cannot be obtained from one ISP is required, a user is required to make a contract with ISP which can provide the information separately.

As a user is required to select ISP depending upon required information and access to the selected ISP in a situation in which the user makes a contract with plural ISPs as described above, he/she is required to remember what information each ISP can provide and operation to request the provision of information is troublesome.

The specification of provided information may be different every ISP and if a terminal receives information provision service from plural ISPs as described above, the terminal is required to be provided with an application program according to the specification of each information and hardware according to circumstances. The above point is particularly a problem in the case of a portable information processing display terminal in which the reduction of the load of an application program and the simplification of hardware are important.

Radio data communication service in which the radiocommunication of various data such as text data and image data in addition to voice communications is enabled takes notice because of the popularization of a portable radiocommunication terminal such as a PHS terminal and the speedup of the transmission speed of data communication using these portable radiocommunication terminals.

In case a PHS terminal is used, data communication in the approximately same transmission speed of 32 kbit/s as the transmission speed of 28.8 kbit/s or 33.6 kbit/s in case a modem is used on an analog telephone line is enabled and the communication of an electronic mail, facsimile transmission and others are enabled outdoors via a portable radiocommunication terminal.

For facsimile transmission, a so-called FAX modem is required to be mounted and there is a problem that a portable radiocommunication terminal is large-sized and the cost is increased. Therefore, heretofore, facsimile transmission directly specifying a destination number from a portable radiocommunication terminal is disabled and for example, facsimile transmission service by a service provider via the service provider (ISP) of the Internet is utilized.

However, in this case, after a user once executes operation for processing for connecting to the service provider of the Internet, he/she is required to execute operation for facsimile transmission and the operation is troublesome.

As it is difficult to provide the function of a printer for outputting the hard copy of receive data to a small-sized portable terminal in case a portable radiocommunication terminal is particularly provided with a function for receiving an electronic mail and a facsimile, receive data is stored in a memory and only a required part is displayed on a display.

If it is expected that mass data is sent, it is desirable that a memory for storing receive data is a mass storage. However, to maintain the portability of a small-sized portable radiocommunication terminal, that is, to prevent a terminal from being large-sized, it is generally difficult to provide a bulk memory. Therefore, heretofore, there is a problem that the quantity of data which a portable radiocommunication terminal can receive is small, plural pieces of receive data cannot be stored in a memory and important receive data cannot be stored. The above problem is particularly remarkable in the case of facsimile data processed as bit map data (dot image data) because the quantity of data is large.

To maintain the miniature, of a portable radiocommunication terminal, a portable radiocommunication terminal is connected to a portable personal computer via a cable and the memory of the personal computer is used for storing receive data. However, in that case, the portable radiocommunication terminal and the portable personal computer are required to be carried simultaneously and it is inconvenient.

As described above, even if a portable radiocommunication terminal and a portable personal computer are connected, for the personal computer, the memory is only utilized for storing receive data and if receive data is processed and displayed, for example, a part of receive data is enlarged or turned and the receive data is displayed, the above enlargement or turning is executed by the application program of a portable radiocommunication terminal and then, the receive data is displayed.

However, there is a problem that if the microcomputer of a portable radiocommunication terminal runs such various application programs, the load of the microcomputer of the portable radiocommunication terminal is increased.

A list of receive data and others are generated by a personal computer and provided to a portable radiocommunication terminal, however, as a portable radiocommunication terminal is constituted so that for the above list, processing such as a sort under a condition desired by a user is executed by an application program, there is also a problem in relation to the above point that the load of the microcomputer of a portable radiocommunication terminal is increased.

When the sending/receiving of facsimile data and an electronic mail and receiving the above information provision service respectively via a portable radiocommunication terminal are enabled as described above, functions for processing and capacity for processing required for a portable radiocommunication terminal vary according to the type of the use, the taste and others of a user of a portable radiocommunication terminal.

For example, for a user who does not need the sending/receiving of facsimile data, an electronic mail and others, however desires to obtain audio information such as music provided by the server, he/she does not need a large liquid crystal display (LCD) for his/her portable radiocommunication terminal. Even for a user who needs the sending/receiving of facsimile data, an electronic mail and others, the size of a display area of LCD with which a portable radiocommunication terminal is provided or a display system of color display or monochrome display and others may differ depending upon the type of the utilization and the taste of the user. Therefore, it is desirable that for a portable radiocommunication terminal operated by a user, plural types of portable radiocommunication terminals different in functions for processing and capacity for processing are prepared.

However, if portable radiocommunication terminals different in functions for processing and capacity for processing are prepared, an application program for processing information sent from the server according to its own functions for processing and capacity for processing is required for each portable radiocommunication terminal. For example, an application program and others for displaying character information and image information from the server according to the size of provided LCD are required and finally, the load of the portable radiocommunication terminal is increased.

It is wasteful for the server to send information which cannot be processed such as character information and image information to a portable radiocommunication terminal without a display function for example. In this case, even if the portable radiocommunication terminal cannot process the information, the communication cost is required to send it and such a situation is not desirable.

SUMMARY OF THE INVENTION

The present invention is made to solve the above problems and the object is to provide a system and an information regeneration terminal which can receive a variety of latest information by the simple operation of accessing to an information provision source without increasing the load of the hardware and an application program of an information regeneration terminal for regenerating provided information.

To solve the problems, there is provided an information provision system characterized in that the information provision system according to the present invention includes a server and an information regeneration terminal, the above server is connected to one or plural information provision devices for providing information via a network or a leased line, the above server is provided with means for generating a channel between the server and an information regeneration terminal in response to a request for connection from the information regeneration terminal and means for receiving the request to provide information from the above information regeneration terminal, acquiring the requested provided information from the above information provision device via a network or a leased line and sending it to the information regeneration terminal via the above channel, and the above information regeneration terminal is provided with means for receiving a request for connection from a user, sending the request for connection to the server and generating a channel between the information regeneration terminal and the server, means for sending a request to provide provided information to the server via the channel based upon operation by the user for a request for provided information and means for acquiring and regenerating the provided information from the server.

In the present invention constituted as described above, the server is connected to one or plural information provision devices for providing information via a network such as the Internet. The information regeneration terminal specifies desired information and sends a request to provide the information.

When the server receives the request to provide the information, it acquires the information from an information provision device which can provide the requested information and sends it to the information regeneration terminal. The information regeneration terminal receives the information and can regenerate it.

As described above, according to the present invention a user of an information regeneration terminal can be provided information which an information provision device connected to a server can provide only by making a contact with the provider of the server. That is, a user of an information regeneration terminal is not required to make a contract with the provider of an individual information provision device even if desired information is owned by plural information provision devices.

As information can be provided by communication between an information regeneration terminal and a server, the protocol and the data format of communication are defined uniquely and an information regeneration terminal is also not required to be provided with a processing function suitable for such an individual data format as in the case of communication with plural information provision devices.

As information stored in a server is not provided but provided information is acquired from an external information provision device connected to the server via a network, the latest information can be always provided if information stored in an external information provision device always has only to be updated.

Another aspect of the present invention in is characterized in that the above server is provided with means for sending the information of the list of providable information to an information regeneration terminal via a channel after generating the channel in response to the request for connection from the information regeneration terminal, the above information regeneration terminal is provided with means for receiving the information of the list of providable information from the server and providing it to the above user and operation for requesting the provision of information by the user is operation for selecting provided information from the list.

In the above present invention the server sends the list of information which can be provided by any connected information provision device for example to an information regeneration terminal which requests connection to the server. As the list is provided to a user with it displayed in the information regeneration terminal, desired information is selected based upon the list. Therefore, a user can check information which a server can provide in a list and request it.

Another aspect of the present invention is characterized in that the above information regeneration terminal and the above server are connected via a network to which another communication terminal is also connected and the information regeneration terminal sends identification information showing that the terminal is a terminal which may be provided information from the server in addition to the request for connection to the server, the server verifies the information regeneration terminal which can be provided information based upon the identification information and sends requested provided information to the information regeneration terminal in response to the request for the provision of information.

According to the present invention, an information regeneration terminal which can be provided information provision service from a server can be specified by offering only the information regeneration terminal related to the server by a contract for example identification information showing that the terminal is a terminal which can be provided information from the server.

Another aspect of the present invention is and characterized in that the above server is provided with a storage section for storing provided information, information which the above information provision device can provide and provided information stored in the storage section are included in the above list of providable information and when a request for the provision of information from the information regeneration terminal is a request for information which the information provision device provides, the server acquires required information from the information provision device via the above network and provides it to the information regeneration terminal.

According to the present invention, as information not required to be updated is stored in the storage section, the server can promptly correspond to a request for provision from an information regeneration terminal.

Another aspect of the present invention is and characterized in that a network to which the above information regeneration terminal and the above server are connected includes a network for a mobile telephone terminal and the information regeneration terminal is provided with radiocommunication means for communicating via a radio base station for a mobile telephone terminal.

According to the present invention, an information regeneration terminal is constituted by a mobile terminal provided with a radiocommunication facility. Therefore, a user of an information regeneration terminal can receive required information in an arbitrary location such as the destination of going out.

An information communication method according to the present invention is a method in which a server and a portable radiocommunication terminal are connected via a network by wireless, the portable radiocommunication terminal sends information in which a destination is specified in cooperation with the server, the server receives receive data addressed to the portable radiocommunication terminal and stores it in the storage means of the server and the portable radiocommunication terminal acquires the above receive data by requesting the server, and characterized in that the server executes processing for sending or receiving information to/from a destination and send/receive information is communicated according to a communication system suitable for the above network between the portable radiocommunication terminal and the server.

In the information communication method according to the present invention, the server is provided with an application program for sending or receiving and acts the sending or receiving of the portable radiocommunication terminal. The server is provided with a storage section for receive data, stores receive data addressed to the portable radiocommunication terminal and when a request is made from the terminal, the server sends the receive data to the terminal.

Therefore, as the portable radiocommunication terminal is not required to be provided with a mass memory and an application for sending or receiving according to a communication system suitable the network may be selected, the size of the portable radiocommunication terminal can be reduced to the minimum and the load is reduced.

Another information communication method according to the present invention one server and plural portable radiocommunication terminals are connected via a network by wireless, the respective plural portable radiocommunication terminals send information in which a destination is specified according to a defined communication system in cooperation with the server and receive information addressed to each, and characterized in that send/receive information is communicated according to predetermined protocol and data format suitable for the above network between the portable radiocommunication terminals and the server independent of the above defined communication system, the server receives send information including a request for calling when a user of the portable radiocommunication terminal makes a call to specify a destination to the above defined communication system, the server executes processing for information communication suitable for the above defined communication system, the server receives data addressed to the portable radiocommunication terminal and stores the above data every portable radiocommunication terminal in the storage means of the server and each portable radiocommunication terminal acquires the above data by requesting to the server.

In the information communication method according to the present invention, when a user operates to transmit a facsimile if a defined communication system is a facsimile transmission system for example, send information including a request for the calling of the facsimile is sent to the server according to predetermined protocol and data format suitable for a network, for example a format (image data) such as a text format and a graphics interchange format (GIF). The server converts the send information including the request for the calling of the facsimile according to a text format and GIF (image data) to facsimile data in a bit map format and sends it to the phone number of the other party included in the request for calling.

Therefore, according to the information communication method of to the present invention, a user of each portable radiocommunication terminal can transmit a facsimile only by operation for facsimile transmission including directly specifying the other party from the terminal. In addition, as the server is provided with an application program for facsimile transmission, the load of the microcomputer of the portable radiocommunication terminal is never increased.

As for example, any facsimile information addressed to each portable radiocommunication terminal is stored in the storage section of the server and an individual portable radiocommunication terminal can request and acquire facsimile information if necessary, a storage section with capacity enough to store the acquired facsimile information for example has only to be provided to each portable radiocommunication terminal. Therefore, a bulk memory is not required for the portable radiocommunication terminal.

Another information communication method according to the present invention is a method in which one server and plural portable radiocommunication terminals are connected via a network by wireless and each of the plural portable radiocommunication terminals receives information addressed to it in cooperation with the server, and characterized in that receive data addressed to the above portable radiocommunication terminal is stored every portable radiocommunication terminal in the storage means of the server, each of the portable radiocommunication terminals is provided with a function for sending a request to process and acquire the receive information addressed to it and stored in the storage means of the server to the server, the server reads the corresponding receive information from the storage means according to the request from the portable radiocommunication terminal, executes processing according to the above request and sends it to the portable radiocommunication terminal which issues the request.

In the information communication method according to the present invention, a mass storage is not required to be provided to a portable radiocommunication terminal and a user of a portable radiocommunication terminal can acquire and utilize receive information from the storage means of the server if necessary. In addition, in that case, the portable radiocommunication terminal can request to process receive information. For example, when a portable radiocommunication terminal requests to display receive information in an enlarged state, the server processes so that receive information is displayed in an enlarged state in response to the request and sends it to the portable radiocommunication terminal.

Therefore, in the information communication method according to the present invention, as an application program related to receive information is not required to be installed in a portable radiocommunication terminal, the load of the microcomputer of a portable radiocommunication terminal is reduced and the cost of the terminal is also reduced.

Another information communication method according to the present invention method in which one server and plural portable radiocommunication terminals are connected via a network by wireless and each of the plural portable radiocommunication terminals receives information addressed to it in cooperation with the server, and characterized in that receive data addressed to each portable radiocommunication terminal is stored every portable radiocommunication terminal in the storage means of the server, each portable radiocommunication terminal is provided with a function for sending a request to acquire information related to receive information addressed to it and stored in the storage means of the server to the server and a function for sending a request to process the above related information to the server and the server is provided with a function for receiving the request to acquire the above related information, for generating the related information based upon receive information addressed to a portable radiocommunication terminal which sends the above request to acquire which is stored in the storage means and for sending the generated related information to the portable radiocommunication terminal which sends the request to acquire and a function for processing the above related information according to a request to process the related information and for sending the processed related information to the portable radiocommunication terminal which sends the request to process the related information.

In the information communication method according to the present invention, the server generates information related to receive information, for example a receive list, sends the list to the corresponding portable radiocommunication terminal and it is displayed on the terminal. The portable radiocommunication terminal can issue a request to sort under a condition for example related to the receive list. The server executes the sort and sends the result of the sort to the portable radiocommunication terminal. Therefore, a portable radiocommunication terminal is not required to be provided with an application program for processing related information and the load of the microcomputer for software is not increased. Therefore, a portable radiocommunication terminal can be manufactured at a low price because it is also not required to be provided with a mass storage.

The object of the present invention is to provide a communication method and a communication system which enables utilization of plural portable radiocommunication terminals different in functions and capacity for processing without increasing the load of a portable radiocommunication terminal and causing a problem, a portable radiocommunication terminal used in the communication system and a server.

To achieve the above object, an information communication method according to the present invention is a method in which one server and plural portable radiocommunication terminals are connected via a network by wireless and the server executes data communication service in response to a request from each portable radiocommunication terminal, and characterized in that each portable radiocommunication terminal sends performance identification information for identifying at least functions or capacity respectively for processing with which the portable radiocommunication terminal is provided to the server, the server identifies at least functions or capacity respectively for processing with which each portable radiocommunication terminal is provided based upon the above performance identification information from each portable radiocommunication terminal and generates information sent to the corresponding portable radiocommunication terminal based upon the result of the identification.

In to the information communication method according to the present invention, performance identification information for identifying at least its own functions for processing or capacity for processing is sent to the server from each portable radiocommunication terminal. The performance identification information is information for identifying the functions for processing or the capacity for processing of a portable radiocommunication terminal such as whether a portable radiocommunication terminal is provided with a display function or not, the size of a display of the portable radiocommunication terminal, whether of color display or monochrome display and resolution.

The server identifies the capacity for processing or the functions for processing of a portable radiocommunication terminal which sends performance identification information based upon the performance identification information from the portable radiocommunication terminal. If information is sent from the server to the portable radiocommunication terminal, the server generates information according to the functions for processing and the capacity for processing of the portable radiocommunication terminal to which the information is sent and sends it.

Hereby, character information and image information are prevented from being sent to a portable radiocommunication terminal not provided with a display function for example. As the server processes the following display information according to the size and others of a display and provides it in case the server sends display information such as character information and image information to a portable radiocommunication terminal provided with a display function, each portable radiocommunication terminal can display the display information immediately provided without processing the display information from the server according to its own display capacity.

Another information communication method according to the present invention method in which one server and plural portable radiocommunication terminals are connected via a network by wireless and the server executes data communication service in response to a request from each portable radiocommunication terminal, and characterized in that the server stores terminal related information generated by relating the identification information of each portable radiocommunication terminal which can be connected via the network and information showing at least functions for processing or capacity for processing with which each portable radiocommunication terminal is provided, the server refers to the above terminal related information based upon identification information sent from each portable radiocommunication terminal, identifies at least functions for processing or capacity for processing of the portable radiocommunication terminal and generates information to be sent to the corresponding portable radiocommunication terminal based upon the above result of the identification.

In the information communication method, the server stores terminal related information generated by relating the identification information of any portable radiocommunication terminal which can be connected to the server via a network and information showing at least the functions for processing or the capacity for processing of each portable radiocommunication terminal.

The server identifies the functions for processing and the capacity for processing of a portable radiocommunication terminal based upon the identification information of the portable radiocommunication terminal sent to the server by the portable radiocommunication terminal in case connection is required and others by referring to terminal related information stored in the server. Information to be sent to the portable radiocommunication terminal is generated based upon the result of the identification.

Hereby, each portable radiocommunication terminal is not required to send information required for the server to identify the functions for processing or capacity for processing of the terminal itself. That is, the server can identify the functions for processing and the capacity for processing of a portable radiocommunication terminal based upon the identification information of the portable radiocommunication terminal sent from the portable radiocommunication terminal in normal processing, can generate information to be sent to the corresponding portable radiocommunication terminal according to the identified functions for processing and capacity for processing of the portable radiocommunication terminal and can provide the information to the corresponding portable radiocommunication terminal.

BRIEF DESCRIPTION OF THE DRAWINGS

FIG. 5 is a block diagram showing the embodiment of the information regeneration terminal according to the present invention;

FIG. 19 explains a member information table generated by the server in the embodiment of the information communication system according to the present invention, giving an example.

DETAILED DESCRIPTION OF THE PREFERRED EMBODIMENTS

Figure 1:
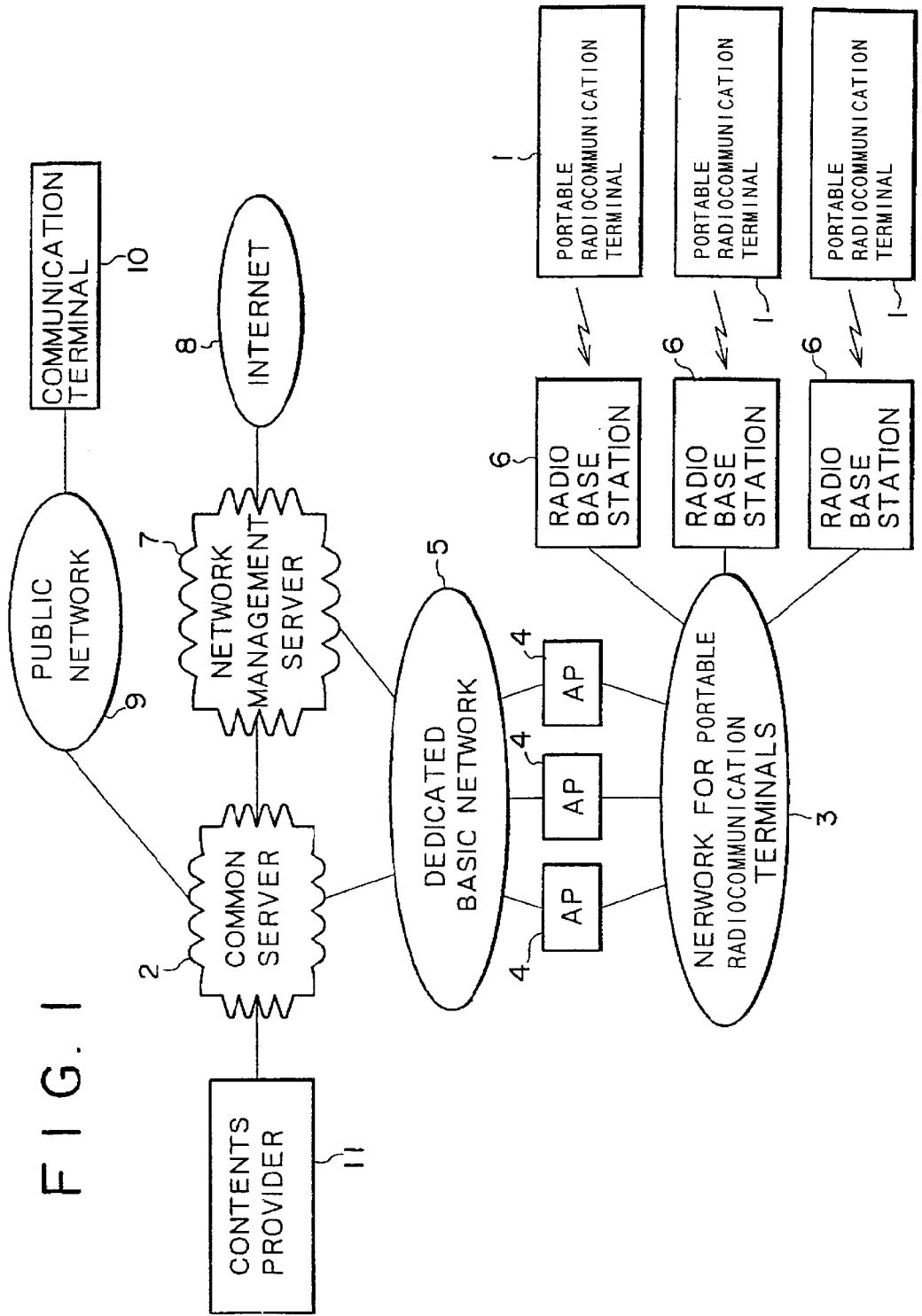
FIG. 1 shows the outline of the whole network configuration to which an information provision system according to the present invention is applied.

Referring to the drawings, an embodiment of an information provision system, an information provision method, an information regeneration terminal and a server respectively according to the present invention will be described below.

In this embodiment, plural information regeneration terminals under a contract with one common server are connected to the one common server via a network and an information provision system is constituted.

In this embodiment, the information regeneration terminal has the same configuration as that of a portable radiocommunication terminal, is provided with a function for receiving information provided from the common server and in addition, is also provided with a function as a telephone for PHS in Japan and a function for data communication such as facsimile and an electronic mail. In facsimile and an electronic mail, information is sent from each portable radiocommunication terminal to the desired other party or information is received by each terminal respectively under the cooperation of an individual portable radiocommunication terminal and the server.

FIG. 1 is an explanatory drawing for explaining the schematic configuration of a communication network system to which an embodiment of the present invention is applied and as shown in FIG. 1, a reference number 1 denotes a portable radiocommunication terminal under a contract with a common server and 2 denotes the common server. Plural portable radiocommunication terminals 1 and the common server 2 are connected via a network 3 for portable radiocommunication terminals and a dedicated basic network 5 connected to the network 3 via one or plural access points 4.

Another portable radiocommunication terminal which is not under a contract with the common server 2 is also connected to the network 3 for portable radiocommunication terminals, however, a portable radiocommunication terminal which can receive information provision service described later from the common server 2 is only the portable radiocommunication terminal 1 under a contract with the common server 2. To avoid confusion with a portable radiocommunication terminal which is not under a contract with the common server 2, a portable radiocommunication terminal under a contract with the common server 2 is called a member terminal in the following description.

Plural member terminals 1 and another same type of portable radiocommunication terminal are connected to a radio base station 6 provided in a predetermined area unit determined in consideration of a range in which a radio wave reaches for example by wireless. In the network 3 for portable radiocommunication terminals, the radio base stations 6 are connected via an optical fiber cable for example.

A network management server 7 for managing the network 5 is connected to the dedicated base network 5. The network management server 7 manages so-called routing between the common server 2 and the member terminal 1. Therefore, the common server 2 can be placed among terminals connected to the dedicated basic network 5 from the point of view of routing management by the network management server 7. In this case, the network management server 7 is also connected to the Internet 8.

In this embodiment, the network management server 7 is directly connected to the common server 2 and access history from member terminal 1 to the common server 2 and others are sent from the network management server 7 to the common server 2. That is, in this embodiment, the common server 2 manages the member terminal 1 overall as collecting the accounting log of the member terminal 1.

That is, in this embodiment, the member terminal 1 is under a contract with the common server 2, however, the member terminal is not under a contract with the network management server 7. The management of the member terminal 1 in relation to the connection to the network is placed in the charge of the network management server 7 via the common server 2, and the common server 2 and the network management server 7 are under a contract. Therefore, the common server 2 can be also connected to another dedicated basic network and its network management server as the common server is connected to the above dedicated basic network 5 and its network management server 7.

In this embodiment, a specific dedicated basic network is allocated to an individual member terminal 1 from the viewpoint of the common server 2 and an access from each member terminal 1 to the common server 2 is managed so that the access is necessarily via the dedicated basic network allocated to the member terminal, however, as the common server 2 and the network management server 7 do not seem to be under a contract from the viewpoint of the member terminal 1, the member terminal 1 seems to access to only the common server 2 and to be managed by only the common server 2.

According to such network management configuration, a user of the member terminal 1 can receive various service which the common server 2 can provide by only making a contract with the provider of the common server 2 without making a contract in relation to an individual network management server 7 to receive various service with which each network management server 7 is provided by offering all service functions with which an individual network management server 7 is provided to the common server 2 for example and it is very convenient.

The common server 2 is provided with a function for enabling the member terminal 1 to send or receive communication data to/from a communication terminal 10 connected to a public network 9 such as a facsimile terminal and a personal computer as described later.

Further, in this embodiment, the common server 2 is provided with a storage which functions as a part of the database of provided information to provide information to the member terminal 1. The common server 2 is connected to a contents provider 11, acquires information in the residual part of the database for information provided to members from the contents provider 11 and provides it to the member terminal 1.

The contents provider 11 is owned by a provider provided with peculiar provided information and the provider provides the member terminal 1 its information via the common server 2 according to a contract with a service provider provided with the common server 2. Only one contents provider 11 is shown in FIG. 1, however, it is natural that plural contents providers 11 may be also connected to the common server 2.

The common server 2 and the contents provider 11 are connected via a leased line or via a network such as the Internet.

In this embodiment, the common server 2 accesses to the contents provider 11, acquires information from the contents provider 11 connected to the common server 2 via a leased line or a network and provides it to the requesting member terminal 1 when the member terminal 1 requests to provide information.

It is also conceivable that the common server 2 acquires information from the contents provider 11 any time, stores it in the internal memory and updates the contents stored in the internal memory, however, if the multiple contents providers 11 exist and provided information is large quantity, there is a problem that the memory of the common server 2 is required to have large capacity.

In the meantime, if the common server 2 acquires only requested information from the contents provider 11 when the member terminal 1 requests and provides it to the member terminal 1 as in this embodiment, the scale of the memory of the common server 2 is not required to be enlarged. If information with which the contents provider 11 is provided is always updated, the common server 2 can always provide the latest information to the member terminal 1 only by acquiring information from the contents provider 11.

In this embodiment, as the common server 2 is connected to one or plural contents providers 11, collects information from these contents providers 11 and provides it to the member terminal 1, a user of the member terminal 1 is not required to make a contract with the provider of each contents provider 11 and the member terminal can receive required information from the common server 2 independent of the format and others of information from the plural contents providers 11.

For a method of providing contents to the common server 2 by a provider provided with peculiar provided information, contents are not provided to the common server 2 via a leased line or a network as described above but the provider of contents may also provide a recording medium such as CD-ROM to the common server 2 and the contents of the recording medium may be also stored in the storage of the common server 2.

In this embodiment, when a contract is made between a user of a portable radiocommunication terminal 1 and the owner of the common server 2, the portable radiocommunication terminal 1 becomes a member terminal 1 as described above. For example, when a user buys a member terminal 1, the user is considered to make a contract with the common server 2.

That is, when a user buys a portable radiocommunication terminal as a member terminal 1, the address information every terminal of the common server 2 via a specific dedicated basic network is offered to the member terminal 1 beforehand as described above and stored in a nonvolatile memory. Identification information (member information) showing the terminal is a member terminal is also stored in the non-volatile memory. The address information of the common server 2 and member information may be also written and registered to the member terminal 1 by a salesperson or a buyer when the member terminal 1 is bought, however, it is desired that the above information is registered to the member terminal 1 beforehand. In that case, as operation for inputting an address is not required, a user can utilize a member terminal 1 without being conscious of the common server 2.

As described later, when the member terminal 1 receives information provision service by the common server 2 or when processing for facsimile communication or electronic mail communication is started via the member terminal 1, beforehand, the member terminal 1 executes processing for automatic connection to the common server 2 using address information and member information stored beforehand.

That is, when a user buys a portable radiocommunication terminal as a member terminal 1, the address information every terminal of the common server 2 via a specific dedicated basic network is offered to the member terminal 1 beforehand as described above and it is stored in a nonvolatile memory. Member identification information showing that the terminal is a member terminal, for example member ID (member number), a password, category information for showing the type of a member terminal 1 and the function identification information of the member terminal 1 to identify functions and capacity for processing with which the member terminal 1 is provided though they are described in detail later are also stored in the nonvolatile memory.

The address information of the common server 2, member identification information, category information and function identification information may be also written and registered to the member terminal 1 by a salesperson or a buyer when the member terminal 1 is bought, however, it is desirable that the above information is registered to the member terminal 1 beforehand. In that case, operation for inputting the above information is not required. Therefore, a user can utilize the member terminal 1 without being conscious of the common server.

As described later, when processing for facsimile communication or electronic mail communication is started in the member terminal 1, beforehand the member terminal 1 executes processing for automatic connection to the common server 2 using the above address information and member identification information stored beforehand. At this time, the above category information and function identification information are also sent to the common server 2 and as described later, the above information is used to identify functions and capacity for processing of the member terminal 1 requesting connection in the common server 2.

In this embodiment, the member terminal 1 can receive various information only by accessing to the common server 2 at any time and anywhere because the member terminal is excellent in portability.

The member terminal 1 is provided with a function for enabling facsimile communication and electronic mail communication in cooperation with the common server 2 and the related function in this embodiment. That is, the member terminal 1 is not provided with a bulk memory for the above communication. Instead, the common server 2 is provided with a memory or a memory area for the receive data of each member terminal 1. Only an application program (software of a microcomputer) for required minimum processing, for example an application program for display is stored in the member terminal 1 and the other application programs for realizing various functions are stored in the common server 2. That is, a user presses a key of a member terminal 1, which is equivalent to the input of a request for obtaining a desired function, the request is sent to the common server 2 and the common server 2 runs the corresponding application program. The result of processing by the application program is sent to the member terminal 1.

The outline of the configuration in this embodiment of the present invention is described above, however, more concrete configuration will be described below.

Figure 2:
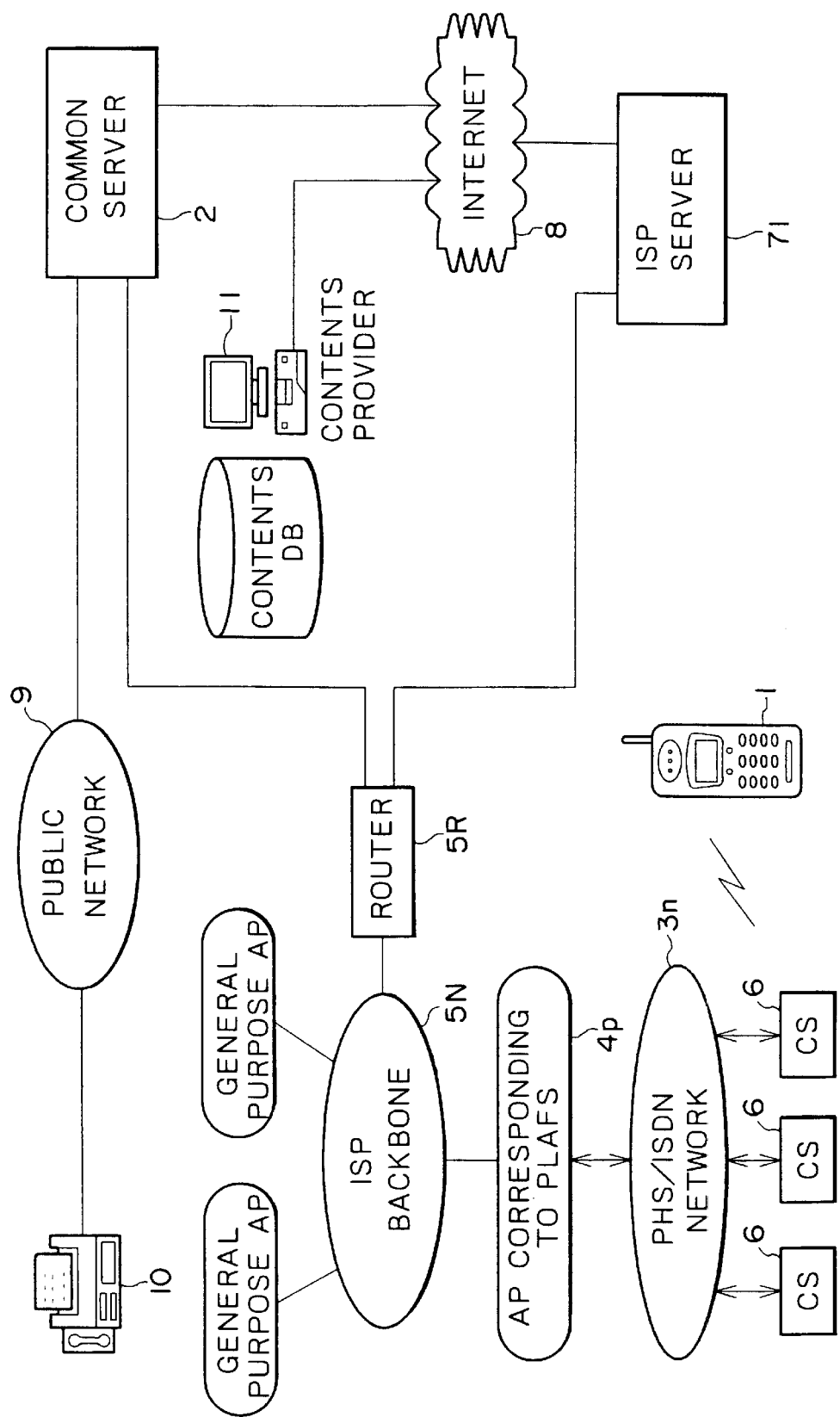
FIG. 2 shows a concrete example of network configuration shown in FIG. 1.

FIG. 2 shows the schematic configuration of the communication network system shown in FIG. 1 more concretely. In this case, the member terminal 1 is provided with configuration as personal digital assistants (PDA) provided with a PHS terminal and a data communication function, is provided with a facsimile communication function and an electronic mail communication function as described later in addition to a telephone function according to PHS and is provided with a function for receiving provided information from the common server 2.

The network 3 for portable radiocommunication terminals to which a radio base station 6 is connected is a PHS/ISDN network 3n in this example. Therefore, the member terminal 1 can communicate with another member terminal 1 or a PHS terminal except members via a radio base station 6, the PHS/ISDN network 3n telephonically and a radio base station 6 and can communicate with a general subscriber's telephone terminal telephonically via a radio base station 6 and the PHS/ISDN network 3n.

The dedicated basic network 5 is a network managed by an Internet service provider (ISP) in this example. That is, a reference number 5N denotes the ISP backbone, that is, a network such as LAN, and the ISP backbone 5N and the PHS/ISDN network 3n are connected via an access point 4P for a PHS Internet access forum standard (PIAFS) which is a standard system for the transmission speed of 32 kbit/s for PHS.

The ISP backbone 5N functions as a router for ISP and the ISP backbone 5N, an ISP server 7I corresponding to the network management server 7 and the common server 2 are connected via the ISP backbone.

The ISP server 7I authenticates the member terminal in response to commission on the side of the common server 2 when the member terminal 1 accesses as described above. That is, the member information (identification information) of a member terminal 1 which accesses to the common server 2 via the ISP server 7I, for example a mail address is registered beforehand in the ISP server 7I and when an access to a terminal connected to the ISP backbone 5N occurs, the ISP server 7I authenticates whether the terminal which accesses is a member terminal 1 to be connected to the common server 2 via the ISP backbone 5N or not and if the terminal is a member terminal 1, the access is received by the common server 2 via a router 5R.

The ISP server 7I sends the access history (log) of the member terminal 1 to the common server 2. The common server 2 receives the respective access history information of plural member terminals from one or plural ISP servers 7I and manages accounting to the respective member terminals and others overall.

The contents provider 11 is connected to the common server 2 via the Internet 8 in this example, acquires information to be provided from the contents provider 11 via the Internet 8 when the common server 2 requires and provides the information to the member terminal 1. As described above, the contents provider 11 may be also connected to the common server 2 not via the Internet 8 but via a leased line. The ISP server 7I may also function as a contents provider.

Figure 3:
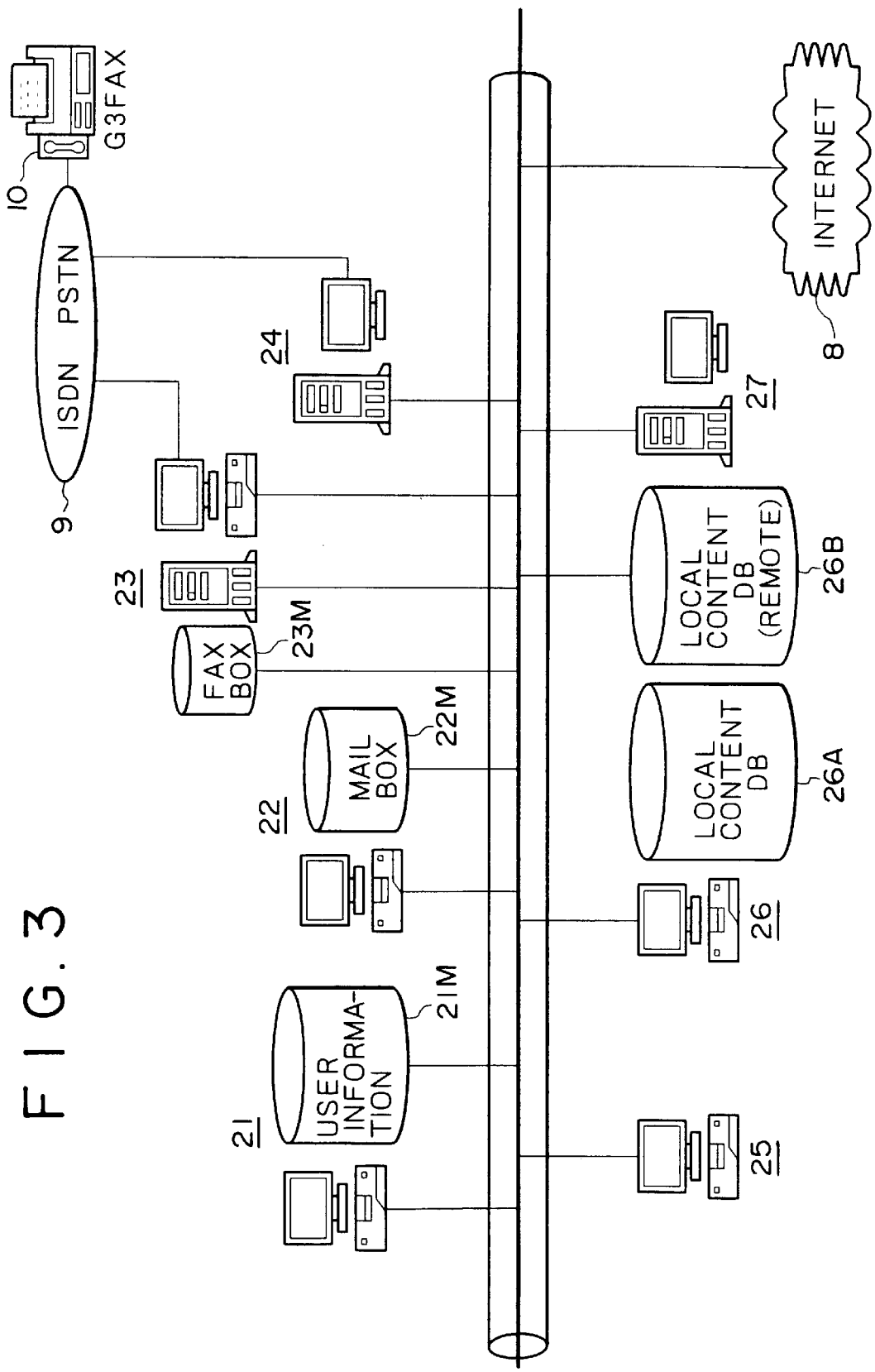
FIG. 3 is a block diagram showing an embodiment of a server according to the present invention.

FIG. 3 is a block diagram showing configuration equivalent to an embodiment of the common server 2. As shown in FIG. 3, a master server 21, a mail server 22, a facsimile server 23, a reception informing server 24, a hyper text transfer protocol (HTTP) D server 25, a contents server 26 and Proxy server for contents 27 are connected to the common server 2 via a local area network (LAN). The LAN is also connected to the Internet 8.

The master server 21 manages member data, applies a contents option and others, executes processing for cancellation and maintains the whole network. The master server 21 is provided with a memory 21M for storing member data (user information) and others.

The mail server 22 mainly manages and operates mail service, executes a post office protocol (POP) or an Internet messaging access protocol (IMAP) server function and executes interface processing with the member terminal 1. The mail server 22 is provided with a memory 22M called a mail box for member terminals. The mail box 22M is provided a memory area every member terminal 1 and the receive data of an electronic mail addressed to each member terminal is stored every member terminal.

In this embodiment, as described later, facsimile data sent from a member terminal to another member terminal in a text data format not including image data is also stored in a memory area for the above another member terminal in the mail box 22M as electronic mail data.

The facsimile server 23 executes an application program provided with a facsimile communication function. The facsimile server 23 uses a mail server function for an interface with the member terminal 1, also uses a public switched telephone network (PSTN) communication line function for G3 facsimile and is connected to an integrated services digital network (ISDN) 9. The facsimile server 23 is provided with a memory 23M called a facsimile box (hereinafter called a FAX box) for storing image data as facsimile data. The FAX box 23M is also provided with a memory area every member terminal and stores facsimile receive data including image data addressed to each member terminal every member terminal 1.

The reception informing server 24 informs reception to each member terminal 1 via the ISDN line (ISDN network 9) in case an incoming call of an electronic mail and facsimile is addressed to a member terminal.

The HTTP D server 25 controls an interface with a member terminal 1. The member terminal 1 is connected to each functional server via the HTTP D server 25 in any processing in case the member terminal is connected to the common server 2.

The contents server 26 is a server for processing contents information provided by the common server 2. The server 26 is provided with two information storing memories 26A and 26B for provided contents information. One memory 26A of them is provided to store provided information in the server 26 beforehand. Provided information is not stored in another memory 26B in the common server 2 and data acquired from the contents provider 11 via the Internet 8 is temporarily stored in the embodiment shown in FIG. 2.

Proxy server 27 for contents is used for acquiring contents data from an external contents provider 11 via the Internet 8. Proxy server 27 produces environment in which a free access from inside a fire wall to outside it is enabled, preventing an unfair access from outside the fire wall by operating the fire wall not shown.

As described above, the common server 2 prepares information stored in the memory 26A and information acquired from a contents provider 11 outside the common server 2 as information to be provided to the member terminal 1. When information requested from the member terminal 1 is information stored in the memory 26A, the common server reads the information from the memory 26A, provides it to the member terminal 1, when information requested from the member terminal is information not stored in the memory 26A, the common server acquires it from a contents provider 11 via the Internet 8 and provides it to the member terminal 1. The above information provision processing will be described in detail later.

Next, the member terminal 1 will be described. FIG. 4 show an example of the appearance of the member terminal 1 and FIG. 5 shows an example of the internal circuitry configuration of the member terminal 1. As described above, the member terminal 1 in this example is provided with the configuration of a complex terminal provided with a mobile telephone function and a data communication facility for communicating a facsimile and electronic mail and receiving information provision service.

Figure 4A:
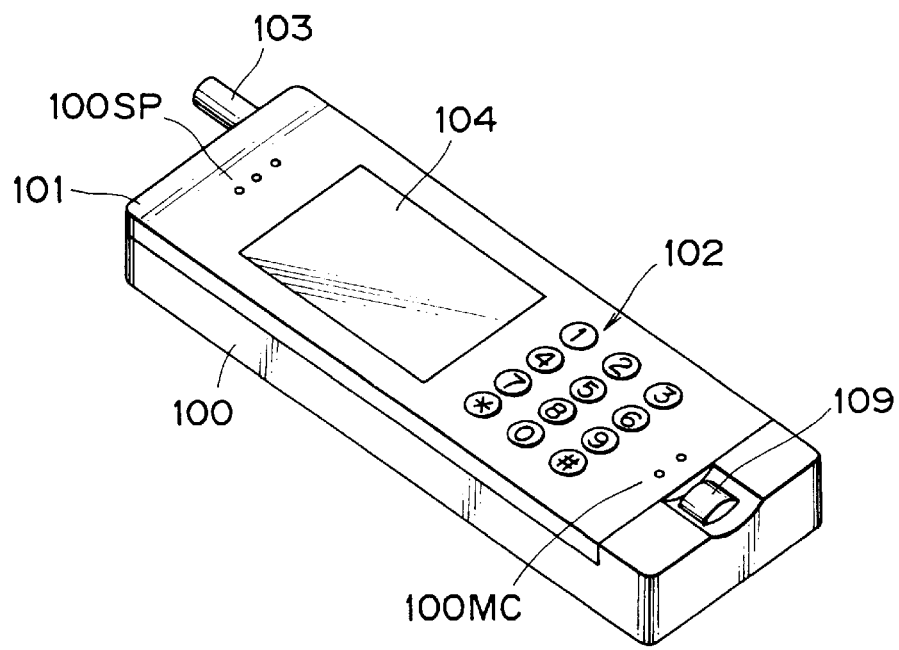
FIGS. 4A and 4B show the appearance of an embodiment of an information regeneration terminal according to the present invention.
Figure 4B:
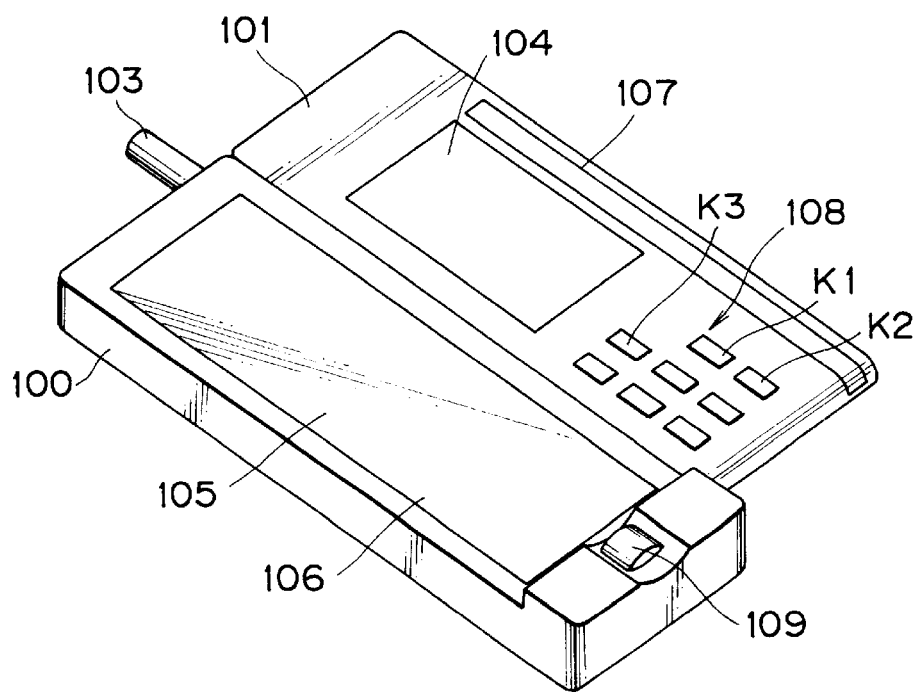

The member terminal 1 in this embodiment is provided with an openable cover 101 as shown in FIGS. 4A and 4B, in a state shown in FIG. 4A in which the cover 101 is closed, the member terminal is in a telephone mode operated as a PHS terminal and in a state shown in FIG. 4B in which the cover 101 is opened, the member terminal is in a data communication mode in which a facsimile communication facility, an electronic mail communication facility and an information provision service receiving function can be obtained. A sensor not shown for detecting the opening or closing of the cover 101 is provided to switch the above modes. For the sensor, for example, a projection is provided inside the cover 101 and a mechanical sensor for mechanically pressing a pushbutton switch by the projection, a sensor switch utilizing a magnet and others may be used.

Outside the cover 101, as shown in FIG. 4A, ten keys 102 for dialing are provided. A reference number 103 denotes an antenna for PHS.

The member terminal 1 is provided with large-sized LCD 105 on the surface on the side of the body 100 which emerges while the cover 101 is opened as shown in FIG. 4B and a message, a function list menu, a provided information list, a received facsimile list, a received electronic mail list and others can be displayed on the display screen of LCD 105. If a menu and a list cannot be displayed on one screen, the display is constituted so that the whole information can be displayed by scrolling the screen or switching to the next page.

In the state shown in FIG. 4A in which the cover 101 is closed, characters and others on the screen of LCD 105 can be read through an LCD window 104 made of a transparent plastic plate for example. In this case, in the state in which the cover 101 is closed, LCD 105 is controlled so that characters and others are displayed only in a part which can be seen through the LCD window 104.

In the member terminal 1 in this embodiment, a transparent touch panel 106 is stuck on the surface of LCD 105 and is provided with a function for accepting touch operation by a pen 107 attached so that the pen can be detached as shown in FIG. 4B and the input of handwritten characters.

Plural keys 108 such as a menu key K1, an online connecting key K2, a function key K3 are provided on the rear side of the cover 101 as a direct key. Further, a jogging dial key 109 provided with two functions of a turning key and a pushbutton key is provided on the right side of LCD 105. Turning the jogging dial key 109 as the turning key is equivalent to operation for selecting an item in a menu and others for example and pressing the jogging dial key as the pushbutton key means input for determining the selected item.

Next, a circuitry block diagram of the member terminal 1 shown in FIG. 5 will be described.

The member terminal 1 in this example is roughly composed of a communication facility section 110 and a control section 120.

The communication facility section 110 is composed of an antenna 111, an RF processor 112, a send/receive data processing section 113, a microphone amplifier 114, a speaker amplifier 115, a microphone 100MC and a speaker 100SP.

The control section 120 is constituted by a microcomputer and is provided with a system control section 121 constituted by CPU, ROM 122, DRAM 123 and a flash memory 124 as an erasable nonvolatile memory.

A switch SW turned on or off according to the opening or closing of the cover 101 is connected to the system control section 121, the system control section 121 detects whether the cover 101 is open or closed according to turning on or off of the switch SW and when the cover 101 is open, the system control section 121 controls the member terminal 1 as a PHS terminal. When the cover 101 is closed, the system control section controls the member terminal 1 as an information regeneration terminal, a terminal for facsimile communication or a terminal for mail communication.

Information showing the state of a group of key switches of ten keys 102 and the state of a group of switches of the keys 108 provided on the rear side of the cover 101 is input to the system control section 121 and when a user presses a key, the system control section 121 detects which of any of ten keys 102 or any of the keys 108 the pressed key is and executes processing according to the detected key.

An LCD driver 125 is connected to the system control section 121, information provided from the common server 2 or another image is displayed on LCD 105 using a program and display data in ROM 122 described later.

A buzzer 127 and a light emitting diode (LED) 126 for informing of an incoming telephone call to a user or informing of an incoming call of facsimile or a mail are connected to the system control section 121.

Minimum communication application programs required for communication in the member terminal 1 such as a program for controlling a sequence for connection to the common server 2, a control program for PHS telephone communication, a control program for receiving information provision service, a control program for facsimile transmission, a control program for mail transmission and a control program for receiving facsimile data and mail data, a program for displaying and controlling on LCD 105, display data such as a menu and others are stored in ROM 122.

DRAM 123 is a memory area in which receive data acquired from the common server 2 is temporarily stored as described later and which is used for a work area.

Address information on a network for automatically connecting the member terminal 1 to the common server 2 via the ISP server 7I as described above is stored beforehand in the flash memory 124 as described above. Identification information (member information) for showing that the member terminal 1 is under a contract with the common server 2 and can receive facsimile communication service, electronic mail service and information provision service from the common server 2 and identifying each member terminal is also stored in the flash memory 124.

The member information is also stored in the main server 21 of the common server 2 and is also managed by the common server 2 as described above. The ISP server 7I also authenticates whether a terminal which accesses based upon the member information is a member terminal or not.

Further, the flash memory 124 is provided with an area for storing data to be stored particularly of receive data temporarily stored in DRAM 123.

The operation of the member terminal 1 composed as described above including the operation of the related common server will be described below.

First, a PHS telephone mode will be described. When a phone number of the other party is dialed using some of ten keys 102 with the cover 101 closed, calling occurs. When a call is incoming to the member terminal 1 as a PHS terminal with the cover 101 closed, it is informed the user by a buzzer 127, when the user responds, he/she can receive the incoming call and the terminal becomes busy.

When a call is incoming with the cover 101 open, conversation is enabled at any time by pressing a talk key not shown and provided on the side of the body 100. However, conversation is to be made with the cover 101 closed.

While the member terminal as a PHS terminal is busy, the member terminal 1 sends a transmission signal and receives a reception signal in a state in which the send/receive data processing section 113 is under control from the system control section 121.

That is, an audio signal from the microphone 100MC is supplied to the send/receive data processing section 113 via the amplifier 114, is converted to send data, is sent to the radio base station 6 via the RF processing section 112 and the antenna 111, the data of the voice of conversation from the other party via the radio base station 6 is received by the antenna 111, the received data is processed by the send/receive data processing section 113, the conversation voice signal of the other party is restored, it is supplied to the speaker 100SP via the amplifier 115 and emitted.

Next, a data communication mode will be described. The member terminal 1 is constituted so that in the data communication mode, it can realize a facsimile function, an electronic mail function, a world wide web (WWW) browser function, a memorandum function and others. A list menu for these functions is displayed on the screen of LCD 105 by operating a menu key of the keys 108. When a user selects and determines his/her desired function in a functional list menu displayed on the screen of LCD 105 by turning and pressing the jogging dial key 109, the member terminal 1 becomes in a mode for executing the desired function.

If facsimile data is transmitted and received in the member terminal 1 in this embodiment and if an electronic mail is transmitted and received, the above data is processed via the common server 2.

Data is communicated between the member terminal 1 and the common server 2 according to a communication system suitable for the network 3 and the network 5 independent of an established communication system as a facsimile communication system. That is, in this embodiment, facsimile data and electronic mail data are communicated according to a simple mail transfer protocol (SMTP) which is a standard procedure used for transferring an electronic mail via the Internet, information is provided from the common server 2 using a WWW browser function according to a hyper text transfer protocol (HTTP) and the member terminal 1 and the common server 2 communicate send data and receive data according to PIAFS utilizing a PHS network in Japan.

In this case, in the member terminal 1, send data is temporarily stored in DRAM 123, is read by the system control section 121 by the execution of transmission and is radioed sequentially via the send/receive data processing section 113, the RF processing section 112 and the antenna 111 according to the above communication protocol and data format.

Data from the common server 2 is received by the antenna 111 and is temporarily stored in DRAM 123 by the system control section 121 via the RF processing section 112 and the send/receive data processing section 113. The above data is sent to LCD 105 as display data via the LCD driver 125 under control by the system control section 121 and display contents based upon receive data are displayed.

The memorandum function includes a handwritten memorandum function for inputting using the pen 107 and the touch panel 106 and a typed memorandum function for displaying a keyboard on the screen of LCD 105 and creating a document utilizing the displayed keyboard. In both cases of a handwritten memorandum and a typed memorandum, a created image or document can be transmitted as facsimile data.

That is, in both modes of a handwritten memorandum and a typed memorandum, a menu bar including the icon of FAX TRANSMISSION is displayed on the screen of LCD 105 and when the icon of FAX TRANSMISSION is selected by the pen for example, an input mode screen including fields for inputting the phone number of the other party terminal to be transmitted, a facsimile title and others is displayed. When the icon of TRANSMISSION displayed in this mode is selected after the phone number of the other party terminal and the title are input, an image or a document created using the handwritten memorandum function or the typed memorandum function is transmitted as facsimile data.

However, as described above, as facsimile data is transmitted to the common server 2 as electronic mail data in this case, image data and document data are not bit map data used for facsimile communication but image data complies with a graphics interchange format (GIF) for example and document data complies with a text data format.

When a destination terminal is not a member, the common server 2 converts received data to bit map data and executes processing for transmitting it to a terminal except a member. When a destination terminal is a member terminal 1, the common server 2 stores received data in the mail box 22M or the FAX box 23M and informs each member terminal 1 that a call addressed to the corresponding member terminal 1 is incoming via the reception informing server 24. Reception is informed not only in case facsimile data is received but in case electronic mail data is received.

When the online connecting key K2 of the keys 108 is pressed if a facsimile function is selected, the member terminal 1 automatically executes processing for connecting to the common server 2. That is, the member terminal 1 sends a request to connect to the common server 2 based upon address data in the flash memory 124. Then, the ISP server 7I which is a network management server authenticates whether the terminal which accesses is a member terminal or not and if the terminal is a member terminal, the ISP server executes processing for connecting the terminal to the common server 2.

The common server 2 recognizes the connected member terminal, generates a list of received facsimile receive data addressed to the member terminal and sends the list to the member terminal 1. Therefore, in this example, the online connecting key K2 also functions as a key for requesting a receive data list.

The member terminal 1 receives the data of the list from the common server 2, temporarily stores it in DRAM 123 and displays the list on the screen of LCD 105. A user can select desired facsimile receive data in the list using the jogging dial key 109 and the pen 107. When the desired facsimile receive data is selected and the icon of FETCH is selected, the member terminal 1 sends a request for fetching the corresponding receive data to the common server 2.

When the common server 2 receives the request, it extracts desired facsimile receive data and transmits the data to the member terminal 1 according to SMTP for an electronic mail. The member terminal 1 temporarily stores the received data in DRAM 123, converts the data to display data and displays the display data on the screen of LCD 105. Therefore, a user can select necessary facsimile data and see it on the screen of LCD 105.

While the facsimile data is received and displayed, the member terminal 1 can make a request for enlargement, turning and others to facilitate seeing receive data to the common server 2. That is, when a user selects the displayed icon of ENLARGEMENT OR TURNING on the screen of LCD 105, a request for receive data including a request for processing receive data such as enlargement and turning is sent from the member terminal 1 to the common server 2.

The common server 2 receives the request, executes processing for the facsimile receive data provided to the member terminal according to the request and sends it to the member terminal 1 which makes the request. The member terminal 1 receives it, temporarily stores it in DRAM 123 and displays the receive data processed according to the request on the screen of LCD 105.

When the online connecting key K2 of the keys 108 is pressed while an electronic mail function is selected, the member terminal 1 also automatically executes processing for connecting to the common server 2 as in case the facsimile function is selected. The common server 2 generates a list of receive data of an electronic mail and sends the list to the member terminal 1.

The member terminal 1 receives the data of the list and displays the list on the screen of LCD 105. A user can select desired receive data of an electronic mail in the list using the jogging dial key 109 and the pen 107. When the desired receive data of an electronic mail is selected and the icon of FETCH is selected, the member terminal 1 sends a request to acquire the corresponding receive data to the common server 2.

When the common server 2 receives the request, it extracts the requested receive data of an electronic mail and sends the data to the member terminal 1 according to SMTP. The member terminal 1 temporarily stores the received data in DRAM 123, converts the data to display data and displays the display data on the screen of LCD 105. Therefore, a user can select an electronic mail considered as required and see it on the screen of LCD 105.

Also in the electronic mail function, while electronic mail data is displayed, the common server 2 executes processing such as enlargement and turning by sending a request for enlargement or turning and others to facilitate seeing received data from the member terminal 1 to the common server 2 as in the case of the above facsimile function and the received data can be displayed on the screen of LCD 105 of the member terminal 1 with the requested processing executed.

As described above, in this embodiment, the member terminal 1 does not process received receive data such as enlarge and turn the data and the common server 2 executes the processing. Therefore, the system control section 121 of the member terminal 1 is not required to be provided with an application program for processing received data, the load of CPU is reduced and a terminal 1 can be manufactured at a low price.

In this embodiment, the member terminal 1 is not required to be provided with an application program for generating and processing related information related to receive data. That is, as described above, when a facsimile function or an electronic mail function in a menu is selected and the online connecting key K2 is pressed, a facsimile receive data list or an electronic mail receive data list is generated by the common server 2 and sent to the requesting member terminal. In the member terminal 1, a user selects desired receive data based upon the list and can see it.

In this embodiment, the common server 2 also executes processing related information such as a list in response to a request from the member terminal 1. For example, a list can be sorted not in the order of reception but in the order of the Japanese syllabary based upon a sender's names or a title, can be sorted by collecting the receive data of the other party with the same phone number or the same mail address and a list in which only receive data with a specific phone number or mail address is extracted can be requested.

For example, in the facsimile function and the electronic mail function, if for example, a user makes a request for the above sort by operating an icon on the screen of LCD 105 while a receive data list is displayed on the screen of LCD 105, the member terminal 1 sends its request signal to the common server 2. When the common server 2 receives the request signal, it sorts the requested receive data list according to the request after it is checked whether the terminal is a member terminal or not and sends the sorted receive data list to the requesting member terminal 1. The member terminal 1 receives it, temporarily stores it in DRAM 123, displays it on the screen of LCD 105 and provides the sorted receive data list to the user.

As described above, in this embodiment, as the common server 2 also generates and processes information related to receive data, the member terminal 1 is not required to be provided with an application program for generating and processing related information and also in this point, the load of CPU of the member terminal 1 is reduced.

When a WWW browser function is selected in a functional list menu displayed on the screen of LCD 105, the member terminal 1 is operated as an information regeneration terminal. At this time, data is communicated between the common server 2 and the member terminal 1 according to HTTP and PIAFS utilizing Japanese PHS network. The data format of information provided from the common server 2 is hyper text markup language (HTML).

Referring to the flowcharts shown in FIGS. 6 and 7, a procedure in which information is acquired using the WWW browser function including each operation of the common server 2 and the information provider 11 will be described below.

That is, when the online connecting key K2 of the keys 108 is pressed while the WWW browser function is selected in a function menu displayed on the screen of LCD 105 (a step S1), the member terminal 1 automatically executes processing for connecting to the common server 2 as in the case of the above facsimile function and the electronic mail function (a step S2). That is, the member terminal 1 sends a request to connect to the common server 2 using the identification information of the member terminal 1 and address data for connecting to the common server 2 via the ISP server 7I respectively stored in the flash memory 124.

In response to the request for connection, the ISP server 7I which is a network management server authenticates whether the accessing terminal is a member terminal or not using identification information included in the request for connection and showing whether the terminal is a member terminal or not (a step S3) and if the terminal is a member terminal, the ISP server executes processing for connecting to the common server 2 (a step S4).

Figure 8:
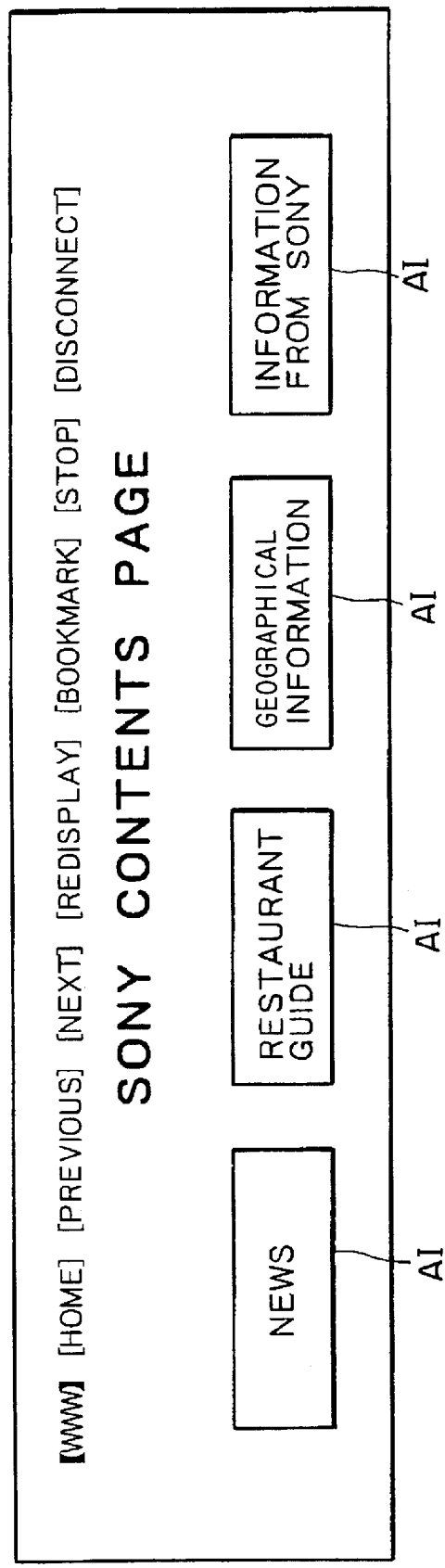
FIG. 8 shows an example of the list of provided information displayed on an information regenerator of the information provision system according to the present invention.

Then, the common server 2 receives the request for connection from the member terminal 1, recognizes what member terminal the connected member terminal is (a step S5) and sends a list of information which can be provided to the member terminal 1 to the so-called home page of the member terminal 1 (a step S6). Therefore, in this example, the online connecting key K2 also functions as a key for requesting a list of providable information. FIG. 8 shows an example of the list of providable information.

The member terminal 1 displays a home page including the list of providable information on the screen of LCD 105 (a step S7). Then, a user operates to select desired information in the list. In the example shown in FIG. 8, as plural pushbutton icons AI showing the contents of information are displayed, the user operates such as specifies the pushbutton icon of requested information by the pen 107 (a step S8). In response to the above operation, the member terminal 1 sends a request for the provision of the specified information to the common server 2 (a step 9).

The common server 2 receives the request for the provision of the information from the member terminal 1 and analyzes what the requested information is (a step S10). As a result of the above analysis, the common server judges whether information to be provided in response to the request is information stored in the internal memory 26A or not (a step S11), if the information requested to be provided is stored in the internal memory 26A, the common server reads the requested information from the memory 26A and sends it to the requesting member terminal 1 (a step S12). If the information requested to be provided is not stored in the memory 26A, the common server 2 accesses to an information provider 11 which provides the corresponding information, acquires the above information requested to be provided and sends it to the requesting member terminal 1 (a step S13).

Next, the member terminal 1 receives information sent from the common server 2 in the step S12 or S13, expands the sent information to display information, displays it on the screen of LCD 105 and provides it to a user (a step S14).

As described above, the member terminal 1 acquires desired information by selecting in a list of information provided by the common server 2 and shown in FIG. 8 and the user can see the acquired desired information on the screen of LCD 105.

In this case, as the common server 2 sends a list of providable information including information from a contents provider 11 as an external information provider and not stored in the internal memory 26A to the member terminal 1 and when the member terminal 1 requests the provision of information which the contents provider 11 owns, the common server 2 acquires the information from the contents provider 11 and provides it to the member terminal 1, the member terminal 1 can receive more provided information than the quantity of information stored in the common server 2.

In addition, as the member terminal 1 has only to request the provision of information to only the common server 2 as if any provided information were stored in the common server 2, operation to request the provision of information is very easy. That is, in a conventional type case of requesting the provision of information to an individual contents provider 11, the member terminal is required to issue a request for connection to the corresponding contents provider and afterward, is required to send a request for the provision of information, however, in this embodiment, as the member terminal has only to send a request for the provision of information only to the common server 2 without being conscious of one or plural contents providers 11 connected to the common server 2, the operation of a user is facilitated.

Figure 9:
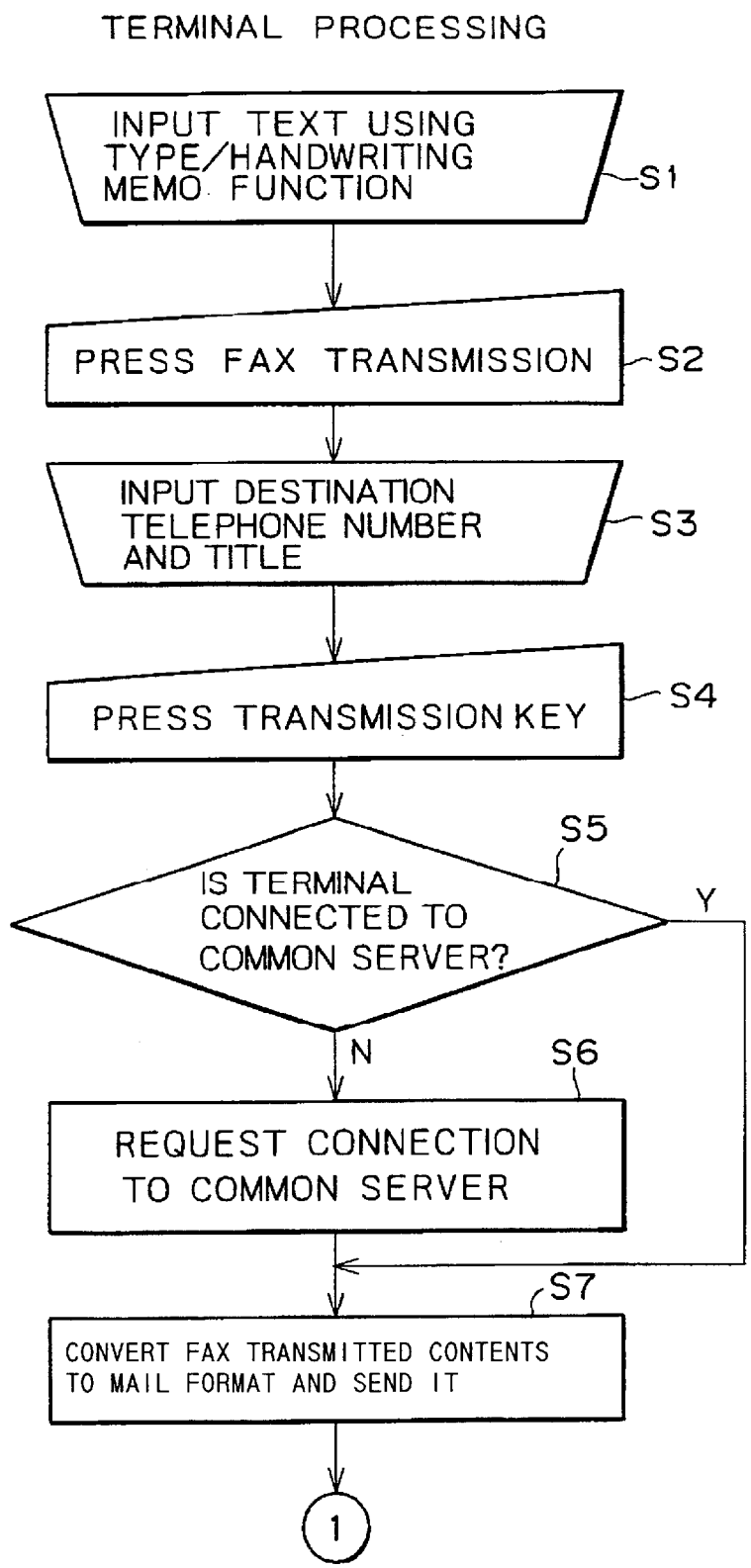
FIG. 9 is a flowchart showing a procedure in a portable radiocommunication terminal of a facsimile transmission procedure in an embodiment of an information communication system according to the present invention.
Figure 10:
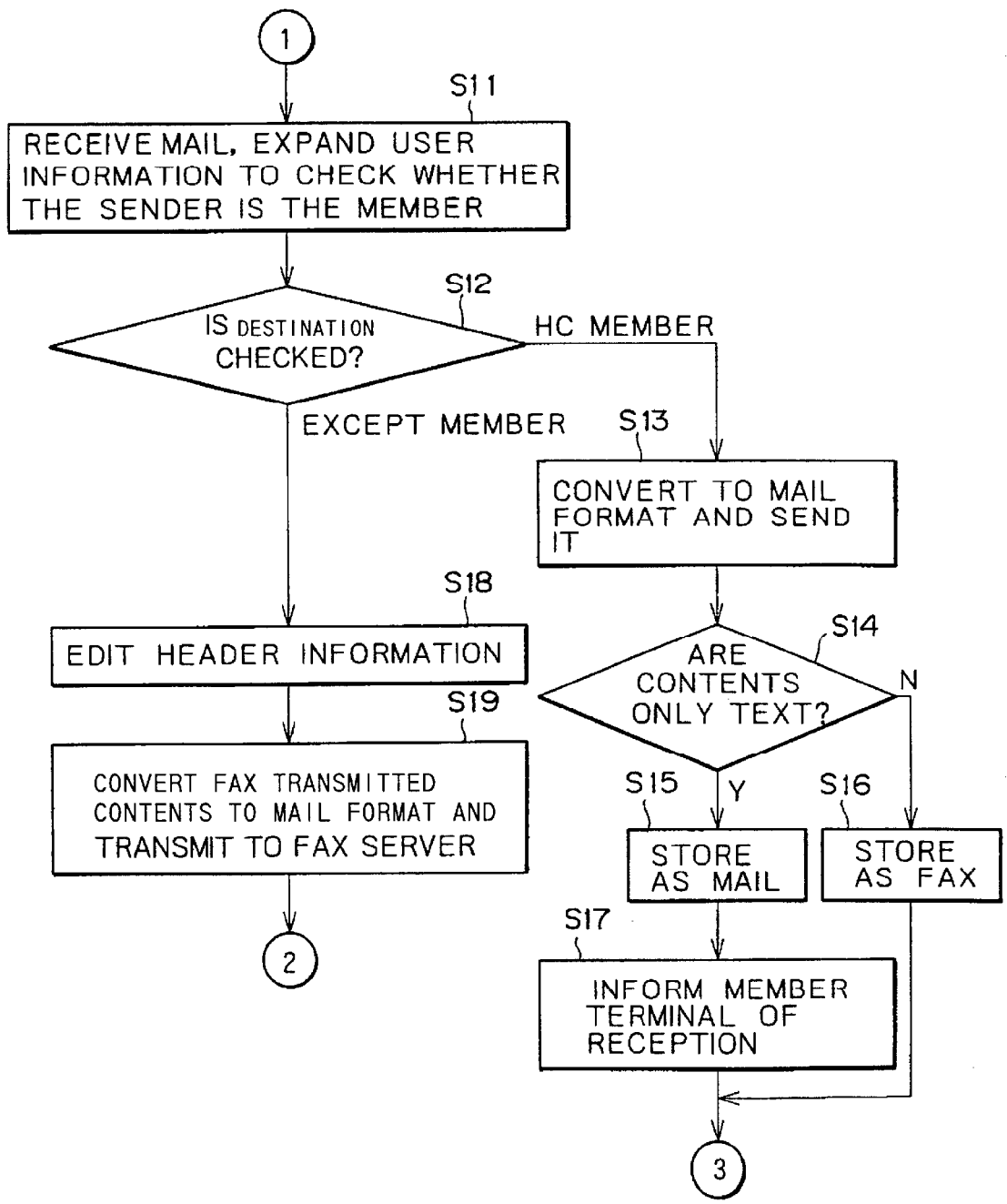
FIG. 10 is a flowchart showing a part of a procedure in a common server of the facsimile transmission procedure in the embodiment of the information communication system according to the present invention.
Figure 11:
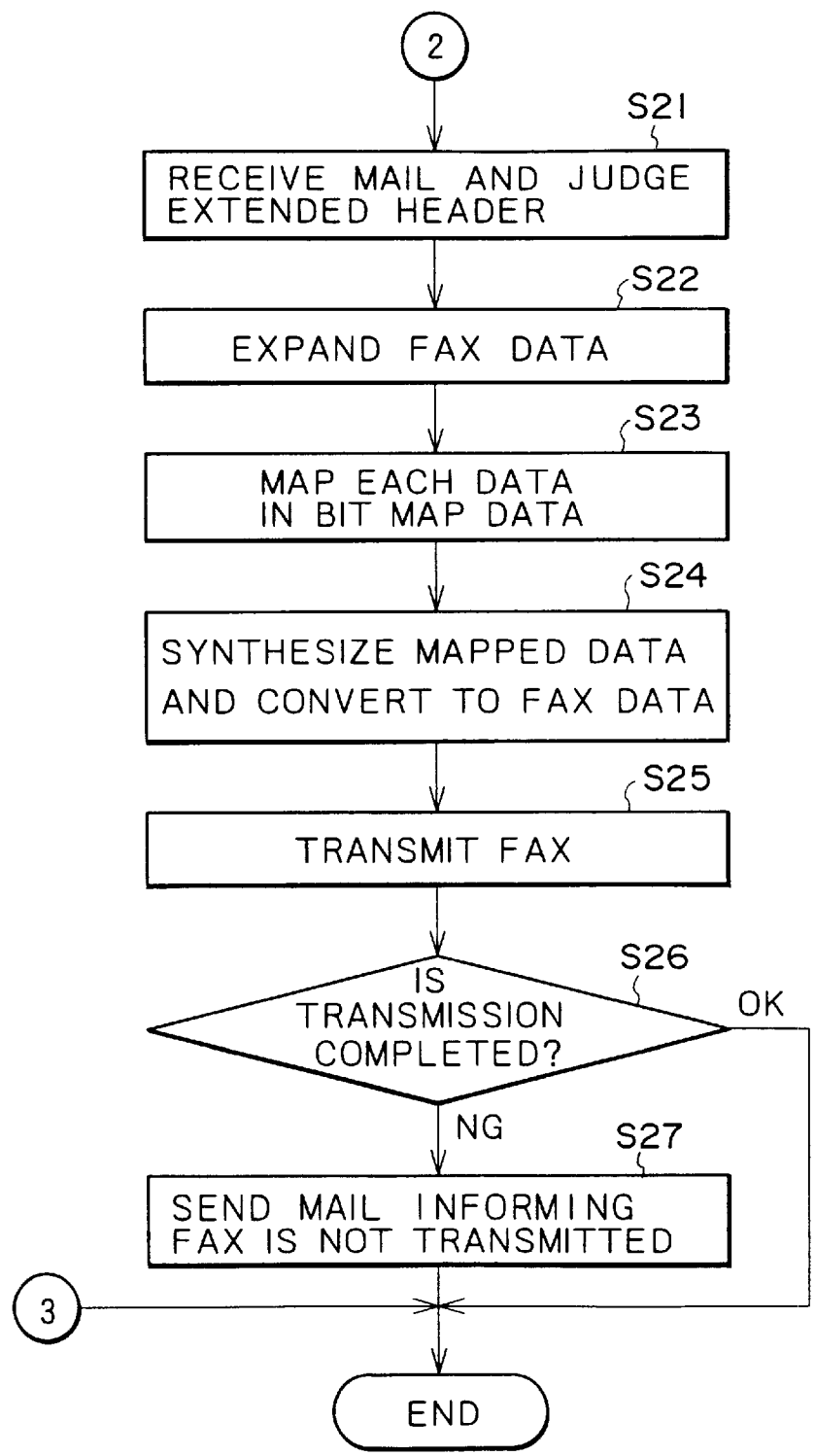
FIG. 11 is as flowchart showing a part of the procedure in the common server of the facsimile transmission procedure in the embodiment of the information communication system according to the present invention.

Next, referring to flowcharts shown in FIGS. 9 to 13, a concrete example of the sharing in a communication processing procedure of processing on the side of the member terminal 1 and processing on the side of the common server 2 will be described below, giving each processing for transmitting a facsimile and receiving facsimile receive data as an example. First, referring to flowcharts shown in FIGS. 9 to 11, facsimile transmission from the member terminal 1 will be described. In this case, FIG. 9 is a flowchart showing the flow of processing operation on the side of the member terminal 1. FIGS. 10 and 11 are flowcharts showing the flow of processing operation on the side of the common server 2, FIG. 10 shows the flow of processing operation in the mail server 22 of the common server 2 and FIG. 11 shows the flow of processing operation in the facsimile server 23 of the common server 2.

As shown in FIG. 9, a user inputs information to be facsimiled as a handwritten memorandum or a typed memorandum using a memorandum function in the member terminal 1 as described above (a step S1). When the input of a text to be sent is finished, the user operates the icon of FAX TRANSMISSION on the screen of LCD 105 (a step S2). Then, as the screen of LCD 105 is switched to an input screen of a destination terminal and the title of send data, the user inputs the phone number of the destination terminal and the title (a step S3). Afterward, the user operates the icon of TRANSMISSION on the screen of LCD 105 (a step S4).

Then, the member terminal 1 judges whether the member terminal is already connected to the common server 2 or not (a step S5) and when the member terminal is not connected to the common server 2, the member terminal makes a request for connection to the common server 2 via the ISP server 7I using the address data of the common server 2 stored in the flash memory 124 and the identification data such as a mail address of the member terminal 1 to connect to the common server 2 (a step S6).

The ISP server 7I authenticates whether the accessing terminal to request connection is a member terminal 1 or not and after it is verified that the terminal is a member terminal 1, the member terminal is connected to the common server 2.

After the common server 2 and the member terminal 1 are connected, the member terminal 1 converts facsimile send data to a mail format and sends it to the common server 2 (a step S7). When the member terminal 1 and the common server 2 are already connected, the step S6 is bypassed and the step S7 is executed.

The mail server 22 of the common server 2 receives a mail from the member terminal 1 as shown in FIG. 10, expands user information (member information) and checks whether the terminal is a member terminal or not (a step S11).

Next, the above mail server checks a destination (a step S12), if the destination is a member terminal, the mail server converts to a mail format and determines to send as an electronic mail (a step S13). The mail server judges whether facsimile data is composed of only text data or includes image data (a step S14), if the facsimile data is composed of only text data, the mail server stores a mail in a receive mail storing area of a member terminal specified as the destination in the mail box 22M (a step S15), if the facsimile data includes image data, the mail server stores a facsimile in a receive facsimile storing area of the member terminal specified as the destination in the FAX box 23M (a step S16) and increments the receive log of the corresponding member terminal. The mail server informs the member terminal 1 about reception (a step S17).

As a result of checking a destination in the step S12, when it is verified that the destination is not a member terminal, the mail server edits header information (a step S18), afterward, converts facsimile send data to a mail format and sends it to the facsimile server 23 according to SMTP (a step S19).

The facsimile server 23 receives a mail from the mail server 22 and judges its extended header as shown in FIG. 11 (a step S21). The facsimile data is expanded into a header, a text and others (a step S22) and the expanded data is developed into bit map data (a step S23). That is, text data and image data according to GIF are converted to bit map data for a facsimile communication system.

Data such as the expanded header and text is synthesized, facsimile send data is generated (a step S24) and a facsimile is transmitted to the terminal of the other party (a step S25). The facsimile server checks whether the transmission is completed or not (a step S26) and if the transmission is completed, the facsimile server terminates the processing. If the facsimile cannot be transmitted, the facsimile server sends a mail informing that the facsimile cannot be transmitted to the mail server 22 and terminates the processing.

As described above, in this embodiment, a user of a member terminal 1 can transmit a facsimile by wireless by inputting information to be facsimiled on the screen of LCD 105 and operating the icon of FAX TRANSMISSION or TRANSMISSION which means the execution of transmission. In this case, the user is not required to operate to connect to the ISP server 7I and the user recognizes as if he/she could transmit a facsimile directly to the other party. That is, the user can transmit a facsimile from his/her portable radiocommunication terminal in the same procedure as in a case that a facsimile is transmitted from a general facsimile terminal.

Next, referring to flowcharts shown in FIGS. 12 and 13, the flow of operation for receiving a facsimile addressed to one member terminal will be described. Facsimile data sent from a member terminal is stored in the mail box 22M if receive data is composed of only text data as described in relation to the above procedure for transmission, is stored in the FAX box 23M if image data is included and a procedure for the above reception is omitted to avoid the duplication of description.

Figure 12:
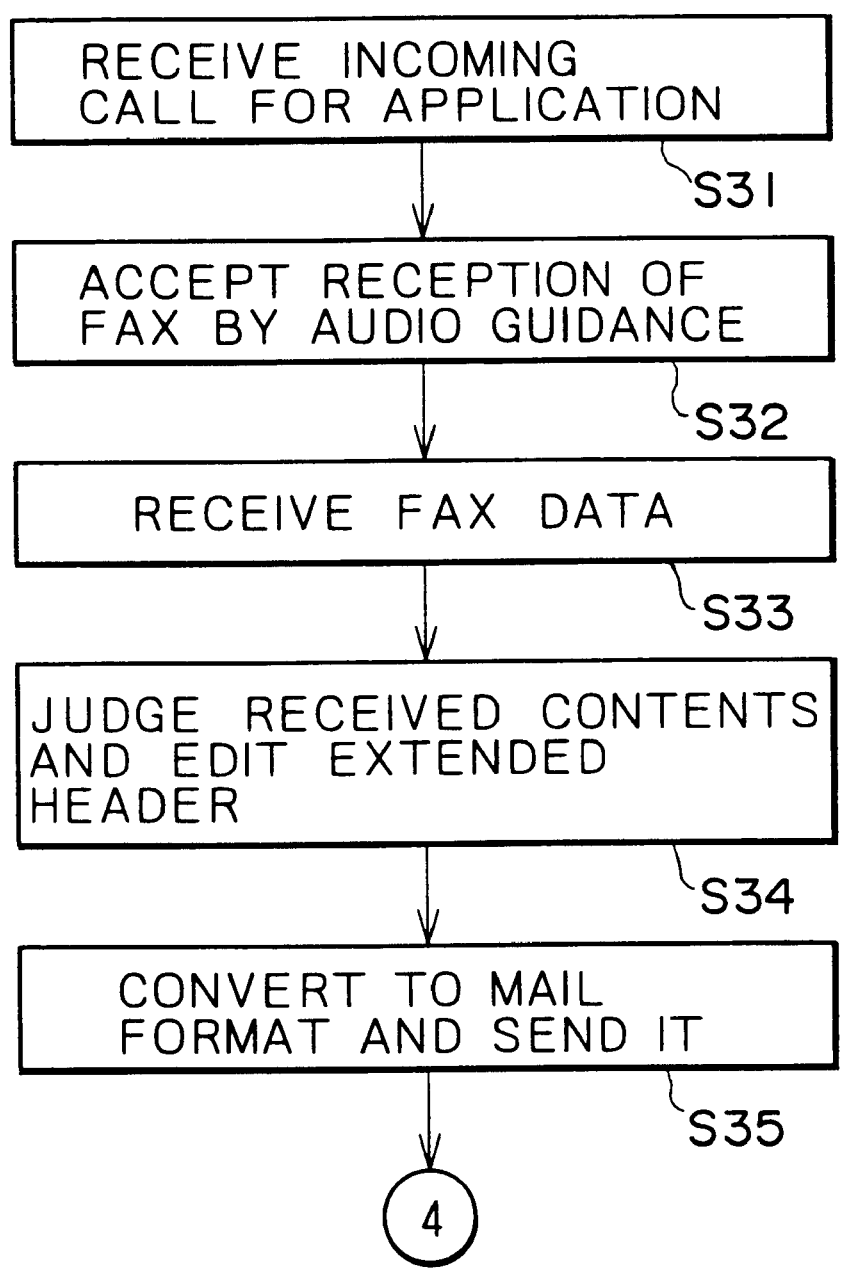
FIG. 12 is a flowchart showing a procedure in a portable radiocommunication terminal of a facsimile receiving procedure in the embodiment of the information communication system according to the present invention.

FIG. 12 shows the operation of the facsimile server 23 of the common server 2 in case facsimile data is incoming from a facsimile terminal except a member terminal to a member terminal 1.

That is, when the facsimile server 23 receives an incoming call for application from a facsimile terminal via the public network 9 such as ISDN shown in FIG. 2 (a step S31), the reception of the facsimile is accepted by audio guidance in this embodiment (a step S32). Then, as facsimile data is transmitted from the above facsimile terminal, the facsimile data is received (a step S33).

The facsimile server 23 judges the received contents and edits an extended header (a step S34). The received facsimile data and the edited extended header are converted to a mail format and transmitted to the mail server 22 according to SMTP (a step S35).

Figure 13:
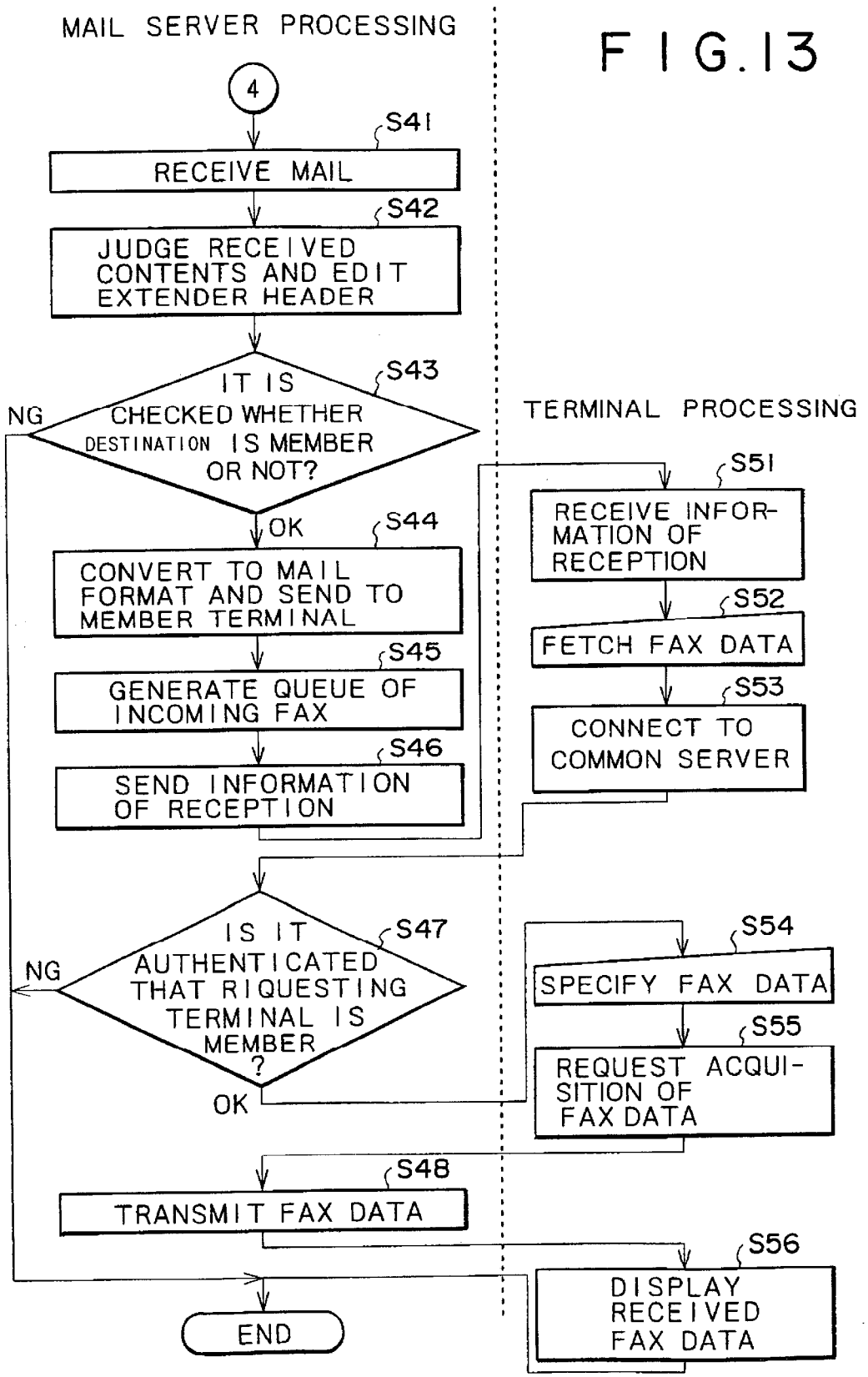
FIG. 13 is a flowchart showing a procedure in the common server of the facsimile receiving procedure in the embodiment of the information communication system according to the present invention.

As shown in FIG. 13, the mail server 22 receives the mail (a step S41), judges the received contents and extracts an extended header (a step S42). The mail server checks whether a destination is a member terminal or not based upon the phone number of the destination (a step S43) and if the destination is not a member terminal, processing for reception is finished.

If a destination is a member terminal, the mail server determines to send to the member terminal according to a mail format. Therefore, the mail server executes processing for converting the phone number to a mail address and others (a step S44). Next, the mail server generates a facsimile incoming call queue (a step S45). That is, the mail server stores received facsimile data in a memory area for a destination member terminal in the FAX box 23M and stores image data according to GIF for example. The mail server sends the information of reception to the member terminal 1 via the reception informing server 24 (a step S46).

The member terminal 1 receives the information of reception (a step S51). When a user operates to fetch facsimile data (a step S52) by operating a receive data fetch key prepared as one of the keys 108 for example, the above processing for connection to the common server 2 is executed (a step S53).

When the processing for connection is executed, the mail server 22 of the common server 2 authenticates whether a terminal requesting the processing for connection is a member terminal or not and if it is verified that the terminal is a member terminal, the mail server sends the above facsimile receive list to the member terminal (a step S47).

As in the member terminal 1, the facsimile receive list is displayed on the screen of LCD 105, the user specifies facsimile data to be fetched in the list (a step S54). Then, a request to acquire the specified facsimile receive data is sent from the member terminal to the common server 2 (a step S55).

The mail server 22 of the common server 2 sends the requested facsimile receive data as a mail to the corresponding member terminal in response to the request (a step S48). The member terminal 1 receives the facsimile receive data and displays it on the screen of LCD 105 (a step S56). The procedure for receiving facsimile data address to each member terminal is finished.

As described above, when a user inputs a request for enlargement or turning by 90 degrees to facilitate seeing facsimile receive data while the facsimile receive data is displayed on the screen of LCD 105 in the member terminal 1, the request is sent to the common server 2, processing for enlargement or turning is executed by the common server 2 and receive data as a result of the processing is sent to the member terminal 1 again. Therefore, the user of a member terminal 1 can see processed receive data on the screen as if the terminal executed processing for enlargement or turning.

In the above embodiment, it is described that a portable radiocommunication terminal is provided with a function of a PHS terminal, however, the function may be also a function of a mobile telephone. In that case, for a network, a network for a mobile telephone is used.

Also, in the above embodiment, an electronic mail and facsimile are communicated between the common server 2 and a member terminal 1 according to SMTP, however, communication between the common server 2 and a member terminal 1 is unified by also communicating an electronic mail and facsimile according to HTTP as in the case of the WWW browser function and an application program for communication can be simplified.

In this embodiment, as a portable radiocommunication terminal sends a request for the provision of information and the user can see provided information on the screen, the user can acquire required information at required time and can utilize it.

In the above embodiment, it is described that a portable radiocommunication terminal is provided with a function of a PHS terminal in Japan, however, the function as a telephone may be also a function of a mobile telephone according to another standard and system. In that case, for a network, a network for a mobile telephone is used.

The information regeneration terminal according to the present invention is not limited to a portable radiocommunication terminal and may be also a portable personal computer connected to a wire telephone line and another communication terminal.

The provided information is not limited to image information, may be also audio information and may be also both image information and audio information.

The list of providable information may be also provided to a user according to not image information but an audio guide format for example and others. In that case, a user is advised to specify a number corresponding to provided information one by one for example so as to request provided information.

In the above embodiment, the common server 2 is provided with the memory 26A for storing provided information, however, the common server may also lack the memory 26A.

Figure 14:
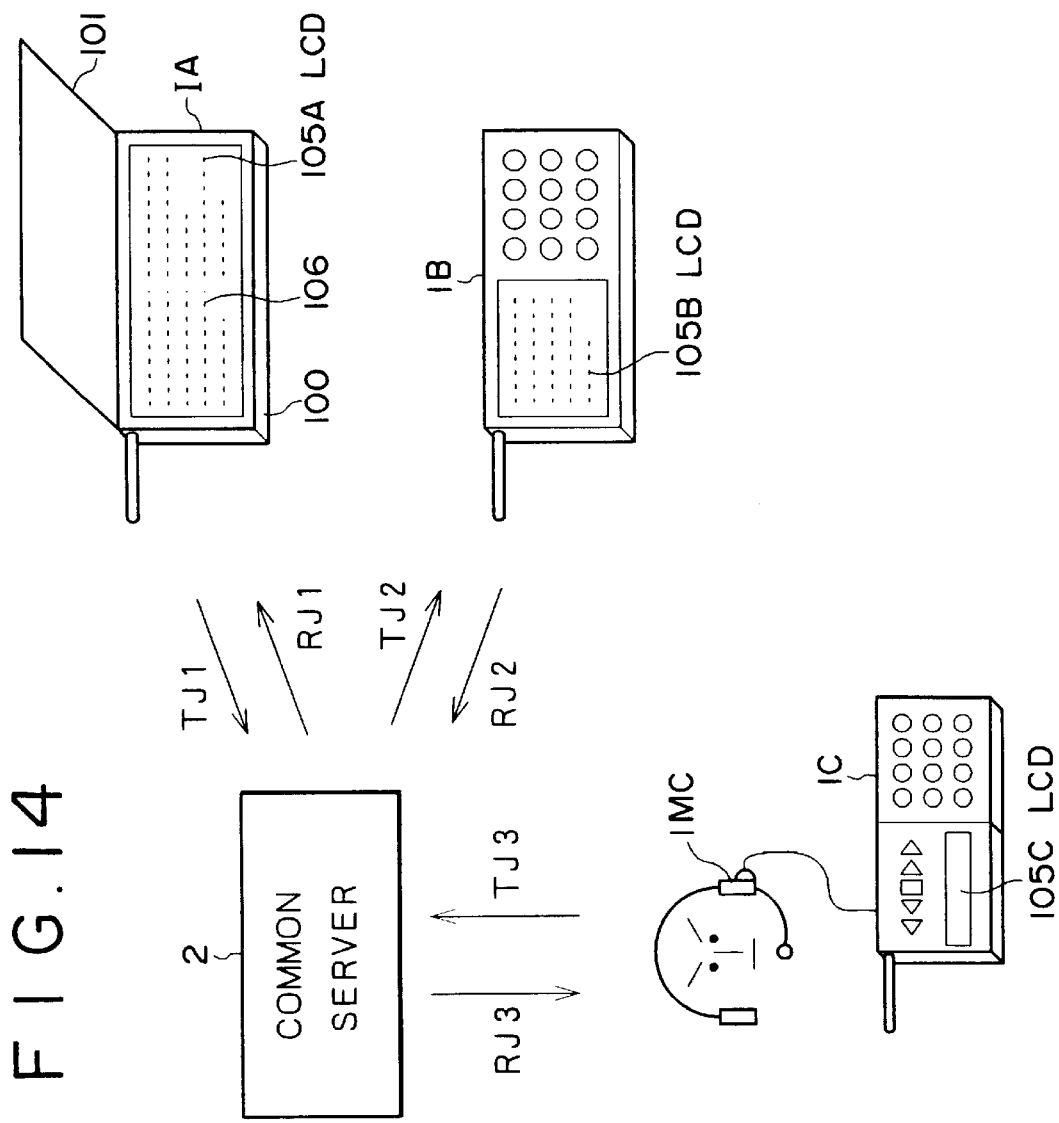
FIG. 14 explains a usable portable radiocommunication terminal in the embodiment of the information communication system according to the present invention, giving an example.

Next, another member terminal 1 will be described. FIG. 14 is an explanatory drawing for explaining a member terminal 1 which can be connected to the common server 2 in this embodiment and as shown in FIG. 14, any of three types of member terminals 1A, 1B and 1C different in functions and capacity for processing can be used in this embodiment.

In the member terminal 1A, a cover panel 101 attached to the body 100 so that the cover panel can be opened or closed is provided and the member terminal is provided with LCD 105A in which a display area exposed in case the cover panel 101 is in an open state for the body 100 is large. In this embodiment, LCD 105A of the member terminal 1 is provided with a display area composed of 640 dots×200 dots and color display is enabled. A touch panel 106 is stuck on the display surface of LCD 105A and the member terminal is constituted so that information can be input via LCD 105A and the touch panel 106 by using a pen for input for example and a user can instruct to the member terminal 1A.

When the cover panel 101 is in a closed state for the body 100, the member terminal 1A becomes a PHS mode and can be used as a PHS terminal. Ten keys, a talk key, a disconnection key and others respectively used in a telephone mode though they are not shown are provided on the surface of the cover panel 101 of the member terminal 1A and are enabled in a telephone mode.

When the cover panel 101 of the member terminal 1A is in an open state for the body 100, the member terminal 1A is in a data communication mode in which facsimile data and an electronic mail can be transmitted or received and information provision service can be received. Various direct keys used in a data communication mode are provided on the rear side of the cover panel 101. For example, the direct keys such as a talk key, a disconnection key, function keys for executing each function and an online connecting key used in case connection to the common server 2 is requested are provided on the rear side of the cover panel 101.

In a data communication mode, as described above, for example, the member terminal acquires information addressed to itself from the common server 2, displays it on LCD 105A and a user can see it. In this case, as the display area of LCD 105A of the member terminal 1A is large, a user can see facsimile data, an electronic mail respectively addressed to the member terminal itself or various contents information provided via the common server 2 satisfactorily in the member terminal 1A. A user can create facsimile data or an electronic mail via LCD 105A and the touch panel 106 using the pen for input and the above data can be also transmitted to a specified destination via the common server 2 from the member terminal 1A.

As described above, in this embodiment, the member terminal 1A is provided with relatively large LCD and is a so-called member terminal for video in which a static image and a dynamic image can be also displayed.

A member terminal 1B is provided with LCD 105B with a smaller display area than that of the member terminal 1A as shown in FIG. 14. LCD 105B is LCD composed of 320 dots×200 dots for example and the number of dots in its longitudinal direction is equivalent to the number of dots in a half of the member terminal 1A in the longitudinal direction. As in the above member terminal 1A, a touch panel 106 is stuck on the display surface of LCD 105B of the member terminal 1B and the member terminal 1B is constituted so that information can be input by using the pen for input and a user can instruct the member terminal 1B.

As shown in FIG. 14, various function keys such as ten keys, a talk key, a disconnection key, a mode switching key for switching a telephone mode and a data communication mode and an online connecting key used in case connection is requested to the common server 2 are provided on the same surface on which LCD 105B is provided. This member terminal 1B is also provided with a PHS mode and a data communication mode as the above member terminal 1A and these modes are switched by pressing the mode switching key for example.

As described above, the member terminal 1B is constituted approximately similarly to the member terminal 1A except that the size of the display area of LCD is different. As described above, the member terminal 1B is provided with LCD with a small display area and is not suitable for displaying a static image and a dynamic image so much, however, the member terminal is a so-called member terminal for information suitable for displaying information such as a character, a symbol and a graphic form.

A member terminal 1C is different from the above member terminals 1A and 1B and used as a so-called audio information terminal without LCD for displaying receive information. The member terminal 1C is provided with a PHS mode and a data communication mode in which information can be provided from the common server and though the member terminal 1C cannot send or receive character data and image data such as facsimile data and an electronic mail differently from the above member terminals 1A and 1B, the member terminal 1C can receive provided audio information.

That is, the member terminal 1C can acquire music, news, traffic information and others respectively stored in the common server 2 as voice data and a user can hear them. Therefore, the member terminal 1C is constituted so that an earphone microphone 1MC is connected to the member terminal 1C, a talk is had and audio information from the common server 2 can be heard respectively using the earphone microphone 1MC.

As shown in FIG. 14, various function keys such as ten keys used as dial keys in a telephone mode, a talk key, a disconnection key, a mode switching key for switching a telephone mode and a data communication mode and an online connecting key used in case connection to the common server 2 is requested are provided to the body of the member terminal 1C. Guidance to a user and others are mainly displayed on LCD 105C provided to the member terminal 1C.

As described above, the member terminals 1A and 1B can be used as a PHS terminal, are respectively provided with LCD 105A and LCD 105B on which receive information can respectively be displayed, can send or receive facsimile data and an electronic mail and can display contents information provided from the common server 2. The member terminal 1C can be used as a PHS terminal as the member terminals 1A and 1B, however, the member terminal 1C is not provided with a function for displaying receive information and the member terminal 1C is constituted so that it acquires only audio information of contents information provided from the common server 2 and a user can hear it.

A user selects and uses a member terminal suitable for his/her purpose and taste of these member terminals 1A, 1B and 1C. For example, it is desirable that a user who frequently sends or receives facsimile data and an electronic mail and wants to acquire contents information provided from the common server 2 in a color image including a static image and a dynamic image uses the member terminal 1A.

It is desirable that a user who wants to acquire facsimile data and an electronic mail or character information, symbol information, graphic information and others of contents information provided from the common server 2 without difficulty though he/she does not require a static image and a dynamic image uses the member terminal 1B. Further, it is desirable that a user who is not required to send or receive character information and image information uses the member terminal 1C. As described above, a user can select and use any of member terminals different in functions and capacity for processing.

In this embodiment, for a member terminal which can be connected to the common server 2, three types of member terminals 1A, 1B and 1C different in functions and capacity for processing are provided. However, these member terminals 1A, 1B and 1C are similar in the basic circuitry configuration though they are different in a display function. It is described above that as shown in FIG. 14, the member terminals 1A, 1B and 1C are respectively provided with LCDs 105A, 105B and 105C different in size, however, in FIG. 5, these are shown as LCD 105.

In the case of the member terminals 1B and 1C as shown in FIG. 5, the mode switching key is provided to the body and connected to the system control section 121. When the mode switching key is operated by a user, the system control section 121 detects it and switches a telephone mode and a data communication mode.

Information showing each state of a key switch group including ten keys and various function keys is input to the system control section 121 and when a key is pressed by a user, the system control section 121 detects what key is pressed and executes processing according to the detected key.

The LCD driver 125 is connected to the system control section 121 and the system control section controls so that a predetermined display image is displayed on LCD 105 using a program installed in ROM 122 described later and display data stored in ROM.

The buzzer 127 and LED 126 for informing a user that a phone call is incoming are connected to the system control section 121.

A program for controlling a sequence for connection to the common server 2, a control program for PHS telephone communication, a program for controlling display on LCD 105, display data for displaying a menu and others and others are stored in ROM 122. In the case of member terminals 1A and 1B, the minimum required communication application programs and others for data communication such as a control program in case the information of reception from the common server 2 is received, a control program for facsimile transmission, a control program for mail transmission and a control program for receiving facsimile data and mail data are further stored in ROM 122.

DRAM 123 is provided with a memory area for temporarily storing receive data acquired from the common server 2 as described later and used as a work area.

Address information in a network for automatically connecting from the member terminal 1 to the common server 2 via the ISP server 7I is stored in the flash memory 124 beforehand as described above. Member identification information (member ID and a password) showing that the member terminal 1 is a terminal under a contract with the common server 2 and a terminal which can receive facsimile communication service, electronic mail service and information provision service from the common server 2 for identifying each member terminal, category information and function identification information for showing functions and capacity for processing of each member terminal are also stored in the flash memory 124.

In this embodiment, category information is information showing the category of a member terminal such as the member terminal is a terminal for video which can display the image information of a static image, a dynamic image and others, a terminal for information which can display a character, a symbol, a graphic form and others or an audio information terminal without a display function.

Function identification information is information showing a compressed pattern for music information, information showing the size of a display, either color display or monochrome display and information including the resolution of a display and others in case the member terminal is a terminal for video or information. In the case of color display, the above function identification information may include information related to the number of displayable colors.

As described above, in this embodiment, these category information and function identification information are used as performance identification information for identifying functions and capacity for processing of each member terminal.

In this embodiment, member identification information is also stored in the main server 21 of the common server 2 and is also managed by the common server 2 as described above.

The ISP server 7I also authenticates whether an accessing terminal is a member terminal or not based upon the above member identification information.

Furthermore, the flash memory 124 is provided with an area for storing data particularly to be stored of receive data temporarily stored in DRAM 123.

The operation including the operation of the related common server of the member terminal 1 provided with above configuration will be described below.

First, a PHS mode will be described. As described above, in the case of the member terminal 1A, the mode of the member terminal 1A is switched to a telephone mode when the cover panel 101 is closed on the body 100. In the case of the member terminals 1B and 1C, when the mode switching key is operated, the mode of each member terminal can be switched to a telephone mode.

When the phone number of the other party is dialed using some of ten keys after the mode is switched to a telephone mode, a call is made. When a phone call is incoming to any of the member terminals 1A, 1B and 1C as a PHS terminal in a telephone mode, it is informed a user by the buzzer 127 and when the user responds, he/she can receive the incoming call and the corresponding member terminal becomes busy.

When a phone call is incoming in a data communication mode, a user can talk at any time by pressing a talk key provided to the body of each member terminal.

The member terminal 1A, 1B or 1C sends a transmission signal or receives a receive signal under control over the send/receive data processing section 113 from the system control section 121 while the PHS terminal is busy.

That is, a speech signal from the microphone 100MC is supplied to the send/receive data processing section 113 via the amplifier 114, is converted to send data, is sent to the radio base station 6 via the RF processor 112 and the antenna 111, talk voice data from the other party via the radio base station 6 is received by the antenna 111, the receive data is processed by the send/receive data processing section 113, a talk voice signal of the other party is restored, it is supplied to the speaker 100SP via the amplifier 115 and emitted.

When the member terminal 1A or 1B receives the information of reception by an incoming psuedocall from the common server 2 via ISDN 9 a part of which is overlapped with a PHS network/ISDN 3n is informed in a standby state in a telephone mode, the member terminal displays a mark for example for informing the reception of facsimile or an electronic mail on LCD 105 and informs a user about the reception of the facsimile or electronic mail.

Next, a data communication mode will be described. As described above, an executable function in the data communication mode is different between a group of the member terminal 1A and 1B and the member terminal 1C. Therefore, first, the operation of the member terminals 1A ad 1B in the data communication mode will be described.

The member terminals 1A and 1B are constituted so that they can realize a facsimile function, an electronic mail function, a WWW browser function, a memorandum function and others in the communication mode. When any of direct keys corresponding to these functions as a function key respectively provided to the member terminals 1A and 1B is pressed to execute these functions, the member terminal 1A or 1B is changed to a mode for executing the function.

In the member terminal 1A or 1B in this embodiment, if facsimile data is transmitted or received or if an electronic mail is transmitted or received, the above transmission or reception is processed via the common server 2 in any case.

Data is communicated between the member terminal 1A or 1B and the common server 2 according to a communication system suitable for the network 3 and the network 5 independent of a fixed communication system as a facsimile transmission system. That is, in this embodiment, send data and receive data are communicated between the member terminal 1 and the common server 2 using SMTP which is a standard procedure used for transferring an electronic mail via the Internet in the case of facsimile data and electronic mail data and using HTTP in the case of information provided from the common server 2 using the WWW browser function according to PIAFS utilizing a PHS network.

In this case, in the member terminals 1A and 1B, send data is temporarily stored in DRAM 123, is read by the system control section 121 by the execution of transmission and is sent by wireless according to the above communication protocol and data format sequentially via the send/receive data processing section 113, the RF processor 112 and the antenna 111.

Receive data from the common server 2 is received by the antenna 111 and is temporarily stored in DRAM 123 by the system control section 121 via the RF processor 112 and the send/receive data processing section 113. The receive data is sent to LCD 105 as display data via the LCD driver 125 under LCD driver 125 under control by the system control section 121 and display contents based upon the receive data are displayed.

The memorandum function corresponds to two types of "a handwritten memorandum" for inputting using the pen 107 and the touch panel 106 and "a typed memorandum" for displaying a keyboard on the screen of LCD 105 and creating a document utilizing the displayed keyboard. In both cases of a handwritten memorandum and a typed memorandum, a created image or document can be transmitted as facsimile data.

That is, in both cases of a handwritten memorandum and a typed memorandum, a menu bar including the icon of FAX TRANSMISSION is displayed on the screen of LCD 105 and when the icon of FAX TRANSMISSION is selected by the pen for example, the screen is switched to an input mode screen including fields for the phone number of a terminal of the other party to be transmitted and a facsimile title. When the icon of TRANSMISSION displayed in this mode is selected after the phone number of the terminal of the other party and the title are input, an image or a document created as a handwritten memorandum or a typed memorandum is transmitted as facsimile data.

However, as described above, as facsimile data is transmitted to the common server 2 as electronic mail data in this case, image data and document data are not bit map data in the case of facsimile transmission, image data complies with GIF for example and document data complies with a text data format.

When a destination is not a member terminal, the common server 2 converts received data to bit map data and executes processing for transmitting facsimile to a terminal except a member terminal. When a destination is a member terminal 1, the common server 2 stores received data in the mail box 22M or the FAX box 23M and informs the corresponding member terminal 1 that a call is incoming to the corresponding member terminal 1 via the reception informing server 24. The information of reception is given not only in case facsimile data is received but in case electronic mail data is received.

When the online connecting key which is one of the direct keys respectively provided to the member terminal 1A and 1B is pressed while the facsimile function is selected, the member terminal 1A or 1B automatically executes processing for connecting to the common server 2. That is, the member terminal 1A or 1B generates connection request information for requesting connection to the common server 2 using address data, member identification information, category information and function identification information in the flash memory 124 and sends it.

Figure 15:
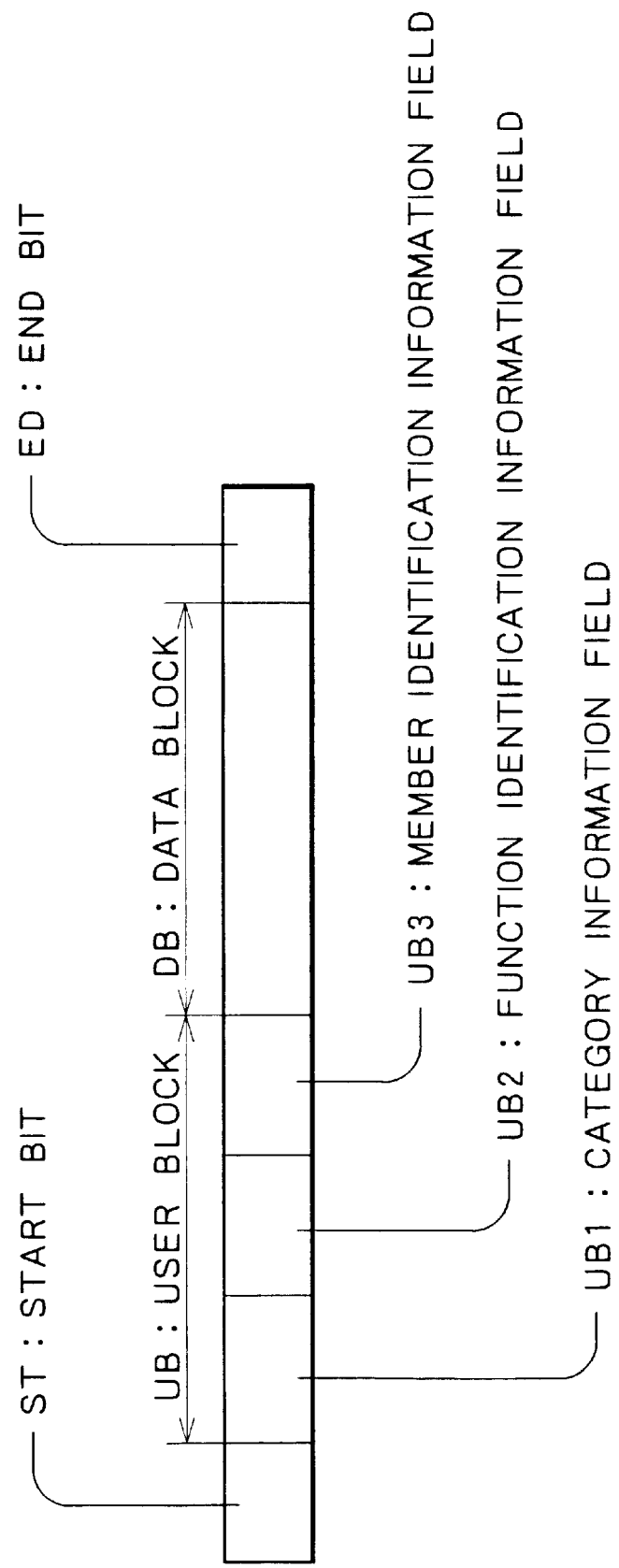
FIG. 15 shows an example of a format of connection requesting information generated in a portable radiocommunication terminal according to the present invention.

FIG. 15 shows an example of the format of connection request information (serial data) generated based upon the information stored in the flash memory 124 and sent in the member terminal 1A or 1B. In this embodiment, the member terminal 1A or 1B generates the connection request information composed of a start bit (ST), a user block (UB), a data block (DB) and an end bit (ED) and sends it.

Figure 6:
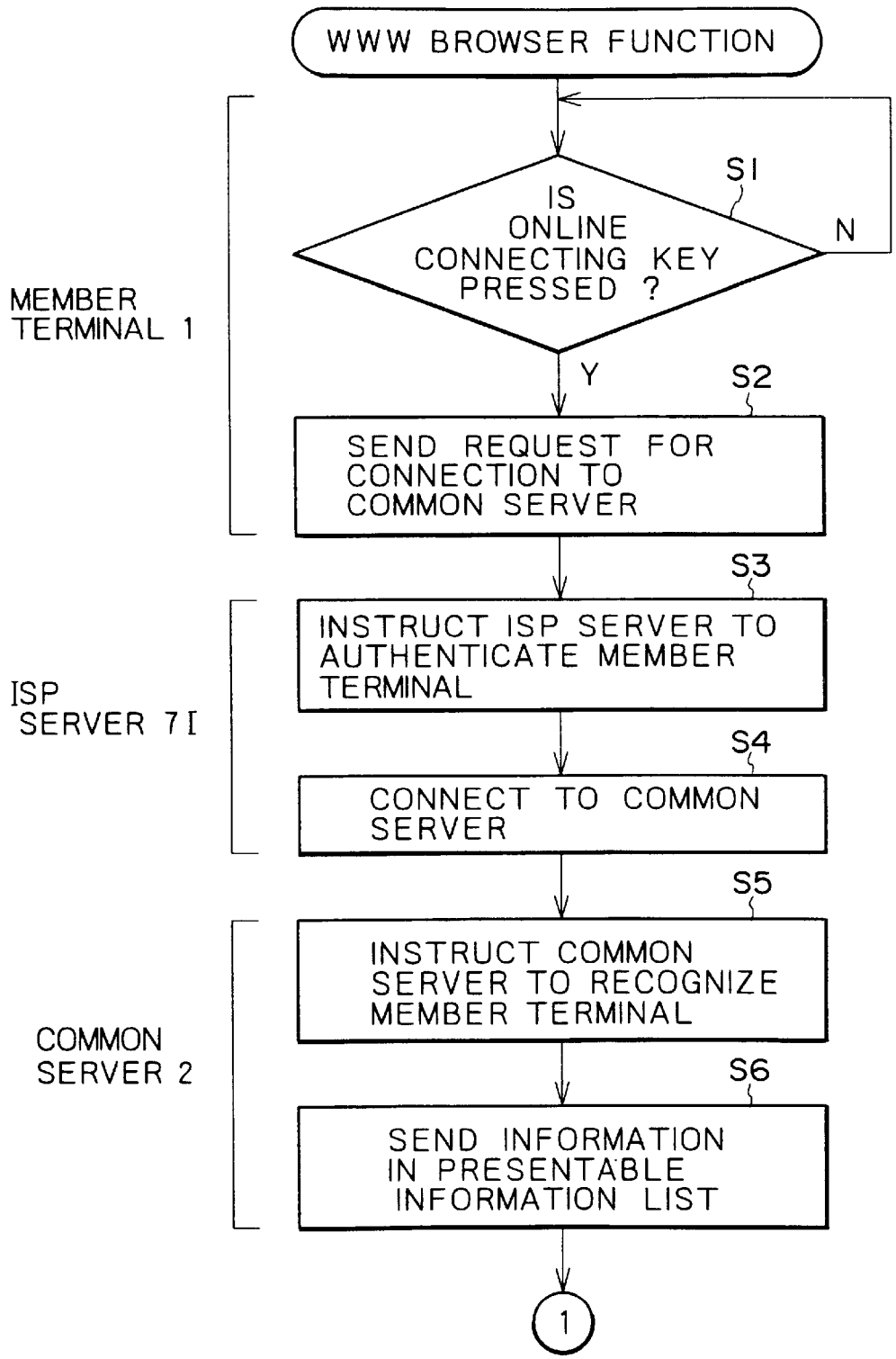
FIG. 6 is a flowchart showing a procedure in an embodiment of an information provision system according to the present invention.
Figure 7:
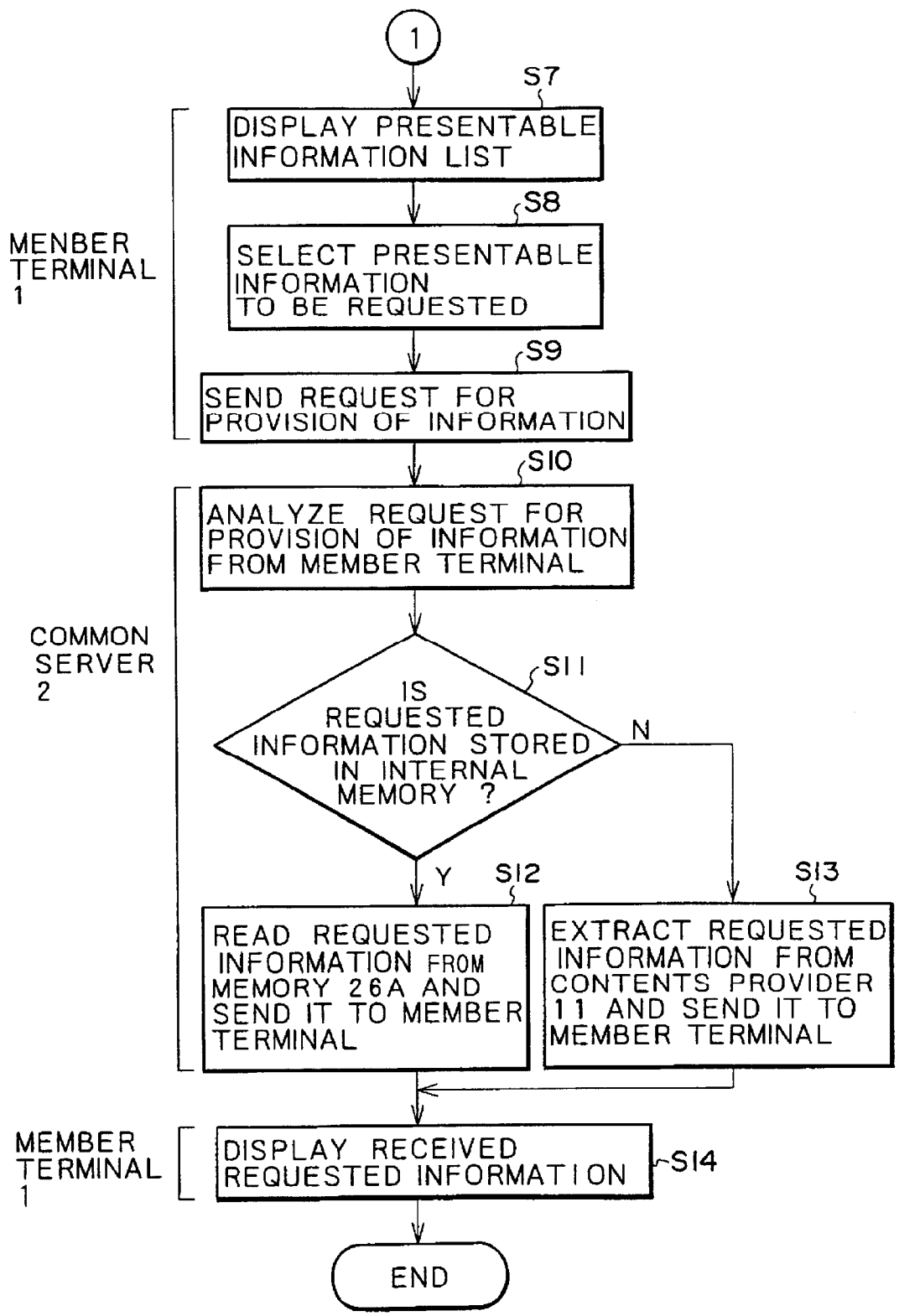
FIG. 7 is a flowchart showing the procedure in the embodiment of the information provision system according to the present invention.

In this case, the user block UB is composed of a category information field UB1, a function identification information field UB2 and a member identification information field UB3 as shown in FIG. 6.

The category information of the corresponding member terminal stored in the flash memory 124 as described above is stored in the category information field UB1. The function identification information of the corresponding member terminal stored in the flash memory 124 is stored in the function identification information field UB2 and the member identification information of the corresponding member terminal stored in the flash memory 124 is stored in the member identification information field UB3. In this embodiment, each of these fields is composed of 16 bits.

Figure 16:
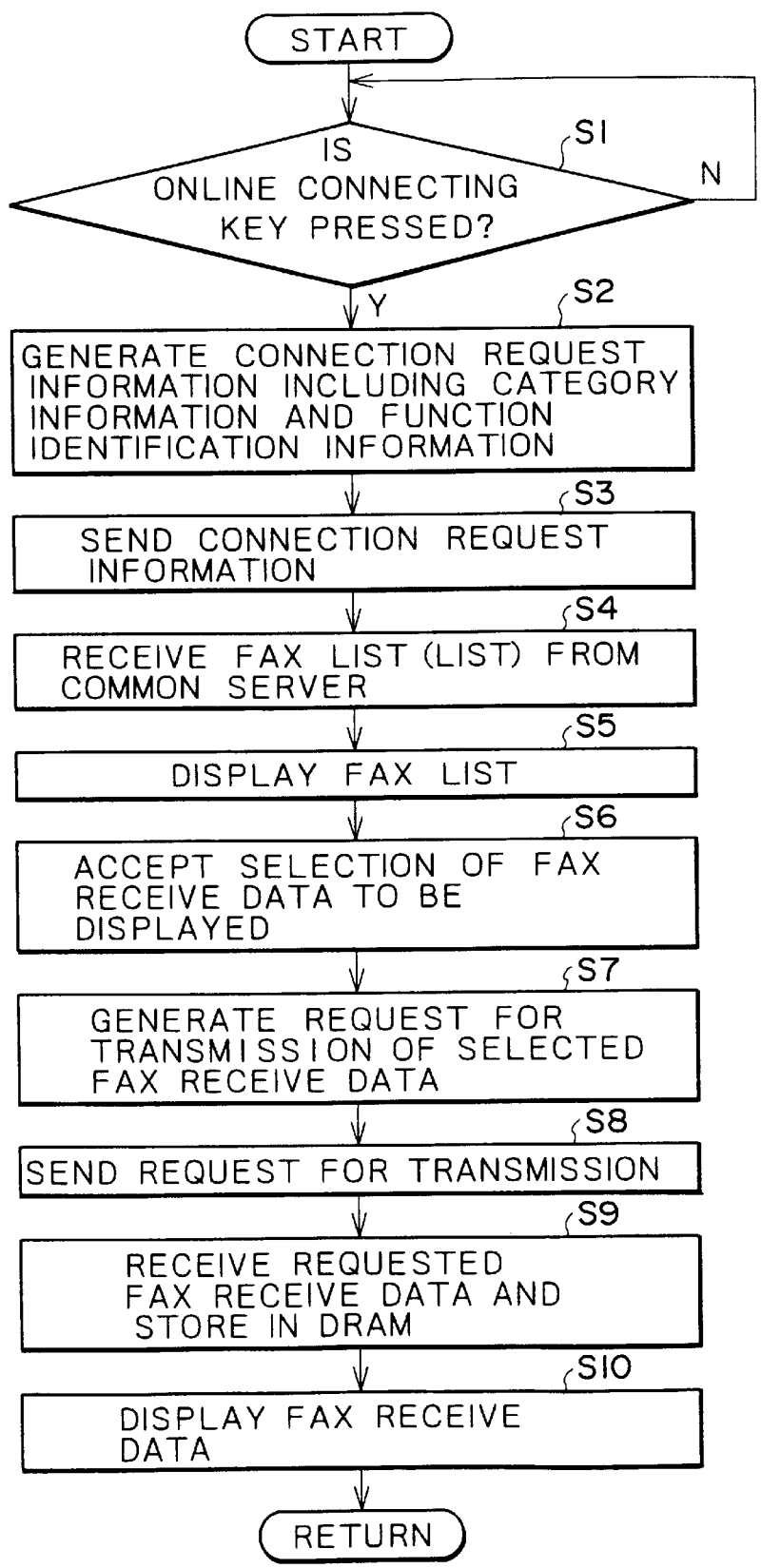
FIG. 16 is a flowchart for explaining the operation when a facsimile function is selected in an embodiment of a portable radiocommunication terminal according to the present invention.

When connection request information shown in FIG. 16 is generated and sent from the member terminal 1A or 1B, the ISP server 7I which is a network management server authenticates whether an accessing terminal is a member terminal or not based upon the above member identification information, if the terminal is a member terminal, the connection request information from the member terminal 1A or 1B is supplied to the common server 2 and processing for connecting the common server 2 and the member terminal 1A or 1B is executed.

The common server 2 recognizes a connected member terminal based upon connection request information and identifies functions and capacity for processing of the member terminal. The common server generates a list of facsimile receive data addressed to the member terminal (hereinafter called a FAX list) according to functions and capacity for processing of the member terminal and sends it to the member terminal.

That is, the common server 2 generates and sends a FAX list composed of a received date and the facsimile number of the other party and displayed in two columns as shown in the member terminal 1A in FIG. 14 according to the size of the display area of LCD 105A because the display area of LCD 105A of the member terminal 1A is large if a member terminal requesting connection is the member terminal 1A.

Also, the common server 2 generates and sends a FAX list displayed in one column by a displayable number on LCD 105B as shown in the member terminal 1B in FIG. 14 for example according to the size of the display area of LCD 105B because the display area of LCD 105B of the member terminal 1B is small if a member terminal requesting connection is the member terminal 1B.

As described above, in this example, the online connecting key functions as a key for requesting a receive data list. At this time, the common server 2 sends the information of reception to the member terminal 1 if there is facsimile or an electronic mail which is addressed to the member terminal requesting connection and the reception of which is not informed the member terminal 1 yet.

The member terminal 1A or 1B receives the information of reception from the common server 2 and displays a facsimile reception display mark and/or an electronic mail reception display mark on LCD 105 as described above.

The member terminal 1 receives a list of facsimile receive data from the common server 2, temporarily stores it in DRAM 123 and displays the list on the screen of LCD 105. A user can select desired facsimile receive data in the list using the pen 107. When the desired facsimile receive data is selected and for example, the icon of FETCH displayed on LCD 105A or 105B is selected, the member terminal 1A or 1B sends a request to acquire the receive data to the common server 2.

When the common server 2 receives the request to acquire the facsimile receive data, it extracts the requested facsimile receive data and generates facsimile receive data sent to the member terminal 1A or 1B in consideration of the size and others of the display area of LCD of the corresponding member terminal 1A or 1B as in case the above FAX list is generated. For example, sent facsimile receive data is generated by enlarging or reducing the facsimile receive data or dividing original facsimile receive data so that it can be displayed. The common server 2 sends the generated facsimile receive data to the member terminal 1 according to SMTP. The member terminal 1 temporarily stores the received data in DRAM 123, converts the data to display data and displays it on the screen of LCD 105. Therefore, a user selects facsimile data necessary for him/her and can see it on the screen of LCD 105.

As the common server 2 generates a FAX list and facsimile receive data according to functions and capacity for processing of the corresponding member terminal, the member terminal 1A or 1B has only to convert information sent from the common serve 2 to display data as it is and display it and is not required to be provided with an application program for editing and processing displayed information on the side of the member terminal.

When the online connecting key is pressed while an electronic mail function is selected, the member terminal 1 also automatically executes processing for connecting to the common server 2 as in case a facsimile function is selected. The common server 2 generates a list of electronic mail receive data, sends the list to the corresponding member terminal 1 and when there is receive data to be informed of reception, the common server sends the information of reception to the corresponding member terminal 1.

The member terminal 1 receives the list and displays the list on the screen of LCD 105. When the member terminal receives the information of reception, it displays the above facsimile reception display mark and/or electronic mail reception display mark on LCD 105.

A user can select desired electronic mail receive data in the list of electronic mail receive data using the pen 107. When the desired electronic mail receive data is selected and the icon of FETCH is selected, the member terminal 1 sends a request to acquire the receive data to the common server 2.

In response to the request, the common server 2 extracts the requested electronic mail receive data and sends it to the member terminal 1 according to SMTP. The member terminal 1 temporarily stores received data in DRAM 123, converts the data to display data and displays it on the screen of LCD 105.

As the common server 2 also generates a list of received electronic mails addressed to a member terminal and the receive data of a received electronic mail according to functions and capacity for processing of the member terminal in the case of the electronic mail function, the member terminal 1A or 1B has only to convert information sent from the common server 2 to display data as it is and display it.

If the online connecting key is pressed in a state in which a WWW browser function is selected, processing for connecting the common server 2 and the member terminal 1 is executed as described above, the common server 2 generates a so-called home page of the common server 2 including a list of information which can be provided by the common server 2 according to the size of the display area of LCD of the member terminal 1A or 1B and sends it to the member terminal 1. At this time, if there is the reception of facsimile or an electronic mail addressed to a member terminal 1 requesting connection and not informed the member terminal 1 yet, the common server 2 also sends the information of reception to the member terminal 1.

When a user selects desired information of providable information in the home page, a request for the information is sent from the member terminal 1 to the common server 2 and the common server 2 generates information according to the request according to the size of the display area of LCD of the member terminal 1A or 1B as in the case of the above home page and sends it to the member terminal 1. The member terminal 1 receives the above information and displays it on the screen of LCD 105. Hereby, a user can see provided information on the screen of LCD 105.

Next, the operation of the member terminal 1C in a data communication mode will be described. As described above, as the member terminal 1C is not provided with a function for displaying receive information, the member terminal 1C is not provided with a facsimile function, an electronic mail function and a memorandum function. The member terminal 1C can acquire information which the common server 2 can provide such as music, news, a weather forecast and traffic information as audio information in a data communication mode and a user can hear it.

When the online connecting key provided as a direct key after the mode is switched to a data communication mode by operating the mode switching key as the above member terminals 1A and 1B, the member terminal 1C generates connection request information and sends it to the common server 2. In this case, the connection request information is generated using address data, member identification information, category information and function identification information in the flash memory 124 as the above member terminals 1A and 1B. In this case, connection request information according to the above format is also generated and sent.

When the member terminal 1C generates and sends connection request information, the ISP server 7I which is a network management server authenticates whether the terminal is a member terminal or not as in the case of the member terminals 1A and 1B and if the terminal is a member terminal, the ISP server executes processing for connecting to the common server 2. The common server 2 realizes the connected member terminal and identifies functions and capacity for processing of the member terminal.

In this case, as the member terminal 1C is a so-called audio information terminal, the common server 2 generates the guidance of information which can be provided as audio information using voice. The common server provides audio guidance telling providable information and operation for selection such as "if you hear news, press a key 1 of the ten keys and if you hear traffic information, press a key 2".

The common server sends information requested by the member terminal 1C as voice data. At this time, even if information to be sent is information composed of audio information and image information, the common server 2 provides only audio information to the corresponding member terminal 1C and does not provide image information.

Hereby, the member terminal 1C can receive only audio information without receiving unnecessary image information.

As described above, in this embodiment, connection request information including function identification information showing its own functions and capacity for processing is sent from each member terminal, the common server identifies the function and capacity for processing of each member terminal based upon the function identification information included in the request for connection and can provide information according to the functions and capacity for processing with which each member terminal is provided to each member terminal.

That is, as shown in FIG. 14, each member terminal 1A, 1B and 1C generates connection request information TJ1, TJ2 and TJ3 based upon category information and function identification information with which each member terminal is provided and sends it. The common server 2 identifies the functions and capacity for processing of each member terminal based upon the category information and the function identification information included in the connection request information TJ1, TJ2 and TJ3, generates reply information RJ1, RJ2 and RJ3 according to the function and capacity for processing of each member terminal based upon a result of the identification and sends it to the corresponding member terminal 1A, 1B and 1C.

Next, referring to the flowcharts shown in FIGS. 7 and 8, the processing of a member terminal 1 and the common server 2 in a data communication mode will be described, giving processing in case a facsimile function in which facsimile data addressed to the member terminal is received is selected as an example.

FIG. 16 is a flowchart for explaining the processing of a member terminal in case the facsimile function is selected in a data communication mode. That is, processing shown in FIG. 7 is processing executed in member terminals 1A and 1B except a member terminal 1C not provided with a facsimile function and an electronic mail function. In the following description, these member terminals 1A and 1B are described as a member terminal 1.

When a facsimile function is selected in a data communication mode and the online connecting key is pressed in the member terminal 1 (a step S1), the system control section 121 generates connection request information using member identification information, category information and function identification information respectively stored in the flash memory 124 as described above in relation to FIG. 15 (a step S2) and sends it (a step S3).

The ISP server 7I which is a network management server authenticates whether the terminal is the member terminal 1 or not based upon the connection request information as described above and if the terminal is the member terminal 1, processing for connecting to the common server 2 is executed. The common server 2 realizes the connected member terminal based upon the connection request information from the member terminal 1, identifies the functions and capacity for processing of the member terminal 1, generates a FAX list according to the functions and capacity for processing of the member terminal 1 which sends the request for connection and sends it.

The member terminal 1 receives the FAX list (a step S4) and displays the FAX list on its own LCD 105 (a step S5). As described above, as the FAX list is generated by the common server 2 according to the functions and capacity for processing of the member terminal 1, the member terminal 1 has only to convert the FAX list to display data as it is and display it on LCD 105 without editing and processing the received FAX list.

The system control section 121 accepts the input of the selection by a user of facsimile receive data in the displayed FAX list (a step S6). As described above, when desired facsimile receive data is selected by a user by touching the pen on the touch panel stuck on LCD 105 and others, the system control section generates a request to transmit the selected facsimile receive data (a step S7) and sends it (a step S8).

When the common server 2 receives the request to transmit the facsimile receive data, the common server 2 reads the selected facsimile receive data. As in the case of the above FAX list, the common server generates facsimile receive data for sending by editing or processing the read facsimile receive data according to the functions and capacity for processing of the corresponding member terminal 1 recognized based upon connection request information and sends it to the requesting member terminal 1.

The member terminal 1 receives the edited or processed facsimile receive data according to its own functions and capacity for processing and stores it in DRAM 123 (a step S9). The member terminal displays the facsimile receive data addressed to itself and requested the common server 2 to send on LCD 105 using the facsimile receive data stored in DRAM 123.

In this case, as facsimile receive data is generated according to functions and capacity for processing of each member terminal 1 by the common server 2, the member terminal can also display facsimile receive data generated for itself according to the size and others of the display area of LCD of the corresponding member terminal 1 by only converting the received facsimile receive data to display data as it is and displaying it on LCD 105 without editing or processing the received facsimile receive data.

Figure 17:
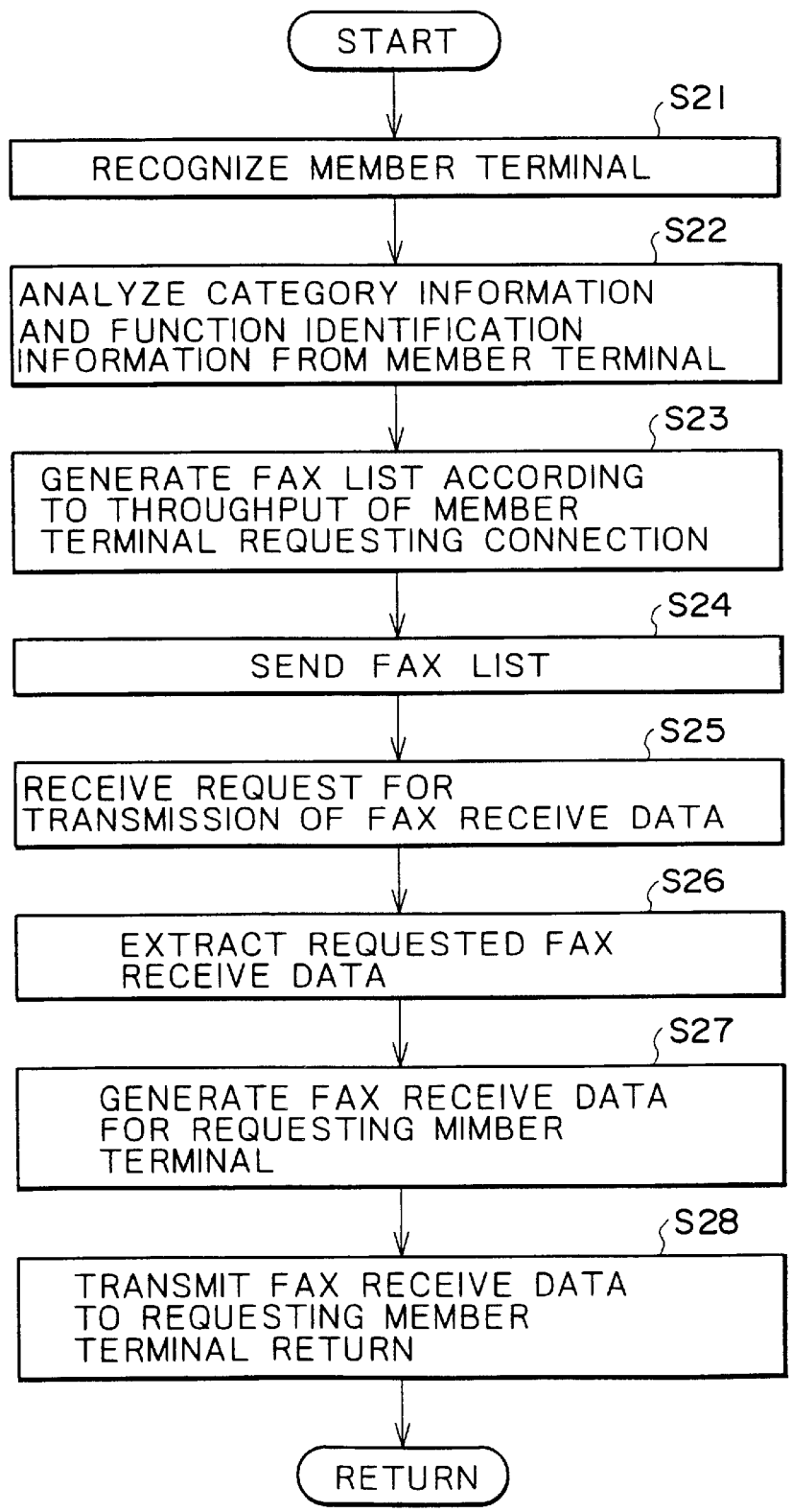
FIG. 17 is a flowchart for explaining processing executed in response to a request for connection from a portable radiocommunication terminal in an embodiment of a server according to the present invention.

FIG. 17 is a flowchart for explaining the processing of the common server 2 executed in response to a request for connection from a member terminal 1 in which a facsimile function is selected. That is, the flowchart shown in FIG. 17 shows the processing of the common server 2 executed corresponding to the processing of the member terminal 1 described using FIG. 16.

When connection request information is sent from the member terminal 1, the ISP server 7I which is a network management server authenticates whether the terminal is a member terminal 1 or not as described above and if the terminal is a member terminal 1, processing for connecting to the common server 2 is executed.

At this time, the common server 2 recognizes the member terminal 1 based upon member identification information included in the connection request information (a step S21). Next, the common server 2 analyzes category information and function identification information included in the connection request information and identifies functions and capacity for processing of the member terminal 1 connected to the common server 2 (a step S22).

Afterward, the common server 2 generates a FAX list which is a list of facsimile receive data addressed to the member terminal 1 according to the functions and capacity for processing of the member terminal 1 requesting connection (a step S23) and sends the generated FAX list to the member terminal 1 (a step S24).

When facsimile receive data requested to send is selected in the FAX list on the side of the member terminal 1, a request to send the facsimile receive data is generated and sent, the common server 2 receives the request to send the facsimile receive data (a step S25) and extracts the requested facsimile receive data (a step S26).

Next, the common server generates facsimile receive data for the corresponding member terminal 1 based upon the extracted facsimile receive data according to functions and capacity for processing of the member terminal 1 to which a line is connected (a step S27) and sends it to the requesting member terminal 1 (a step S28).

As described above, the member terminal 1 informs the common server 2 about its own functions and capacity for processing by sending connection request information including category information and function identification information. The common server 2 identifies the functions and capacity for processing of the member terminal 1 based upon its category information and function identification information included in the connection request information from the member terminal. The common server can generate sent information according to the identified functions and capacity for processing and can send it.

Hereby, each member terminal 1 is not required to edit or process display information for example according to its own functions and capacity for processing in each member terminal and can output received information as it is. That is, as the common server 2 acts editing or processing display information to be edited or processed by each member terminal 1, the load of each member terminal can be reduced.

Figure 18:
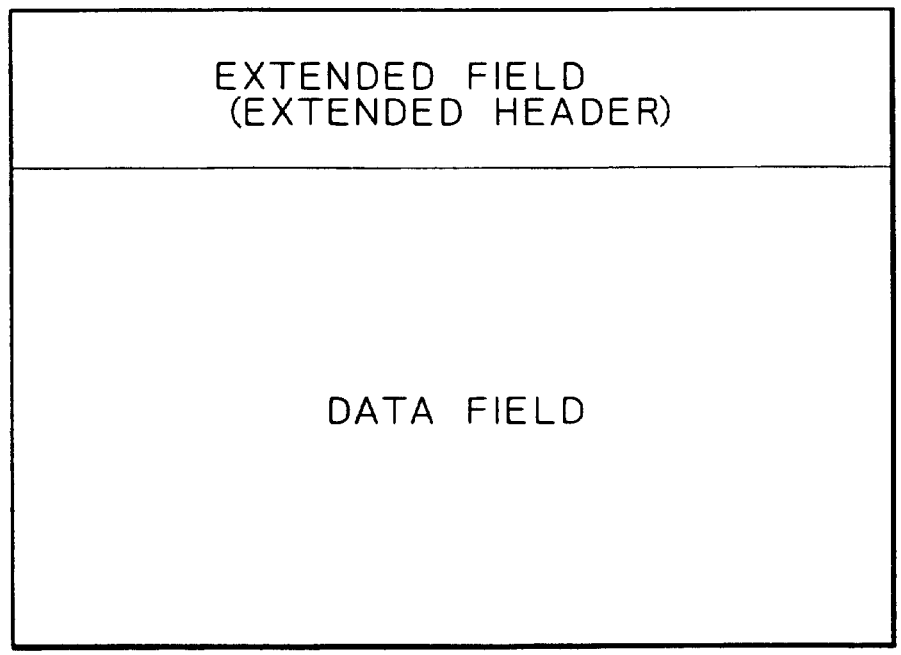
FIG. 18 is an explanatory drawing for explaining data structure communicated according to HTTP.

FIGS. 16 and 18 show processing in case a member terminal selects a facsimile function, however, in case the member terminal selects an electronic mail function, an electronic mail list which is a list of received electronic mails and an electronic mail can be also generated according to functions and capacity for processing of a member terminal 1 to be sent and can be also sent.

In case a member terminal receives information provision service using a WWW browser function, information supplied from the common service 2 to the member terminal 1 can be also generated according to functions and capacity for processing of the member terminal by including category information and function identification information in connection request information to the common server 2 and can be also sent.

In the case of an audio information terminal as the above member terminal 1C, category information showing the terminal is a music information terminal is also included in connection request information to the common server 2 and sent. Hereby, the common server 2 recognizes that the member terminal 1C is an audio information terminal and can send only audio information to the member terminal 1C.

As described above, data is communicated between a member terminal 1 and the common server 2 in a WWW browser function according to HTTP and according to PIAFS utilizing a PHS network. In this case, the data format of information communicated between the member terminal 1 and the common server 2 is HTML.

In this case, the structure of data communicated between the member terminal 1 and the common server 2 according to HTTP is composed of an extended field and a data field as shown in FIG. 18.

In this embodiment, an extended header is stored in the above extended field. The type information of a member terminal 1, information showing the version of software, information showing member ID (user ID) and the other information are stored in the extended header of HTML data to be sent from the member terminal 1 to the common server 2.

In this case, the type information is information equivalent to the above category information and for example, the type information shows whether a member terminal 1 is a terminal for music, a terminal for video or a terminal for information. The information showing the version of software shows the version of software installed in the member terminal 1 and for example, a compressed pattern of the music information of the member terminal 1, the size of a display and whether the display is a monochrome display or a color display can be shown by the information. The member ID is information equivalent to the above member identification information.

Hereby, the common server 2 can judge functions and capacity for processing of a member terminal 1 by checking information stored in the extended header of information from the member terminal 1.

As the above extended header exists in information sent from a member terminal 1 to the common server 2 in case connection and others are requested from the member terminal 1 to the common server 2, the common server 2 can grasp functions and capacity for processing of the member terminal 1 not only when connection is requested but every time information from the member terminal 1 is received.

Therefore, as described above, the common server 2 can judge functions and capacity for processing of a member terminal 1 when the common server receives information from the member terminal 1 by storing information for judging the functions and capacity for processing of the member terminal 1 in the extended header of HTML information sent from the member terminal 1 differently from a case that connection request information including category information is provided to the common server 2 when connection is requested by the member terminal 1, and the common server can start processing according to information sent from the member terminal 1 promptly without checking connection request information sent before.

As described above, an electronic mail and facsimile are communicated between the common server 2 and a member terminal 1 according to SMTP. However, in case an electronic mail function and a facsimile function are used, information for informing about functions and capacity for processing of a member terminal 1 can be also stored in the extended header of information sent from the member terminal 1 to the common server 2 by communicating data according to HTTP as in the case of a WWW browser function and can be also informed the common server 2.

Other Embodiments

In this embodiment, a member information table in which member identification information for identifying each member terminal and information showing functions and capacity for processing of each member terminal identified based upon the member identification information are related is stored in common server 2. The common server 2 identifies functions and capacity for processing of each member terminal based upon connection request information from each member terminal or member identification information included in the extended header of information from each member terminal and category information, function identification information, type information and information showing the version of software are not sent from each member terminal.

That is, in this example, the member information table shown in FIG. 19 is generated in the common server 2 in a system constituted as the above embodiment. In this example shown in FIG. 19, a member information table composed of member identification information for enabling the identification of each member terminal, the category information of a member terminal specified based upon the member identification information, information showing a compressed pattern of audio information, information showing the size of a display and information showing whether color display or monochrome display is generated every member terminal.

In this case, each information composing the member information table shown in FIG. 19 is equivalent to each information described in the above embodiment referring to FIGS. 1 to 8. That is, member identification information is information for identifying each member terminal and category information is information showing the category of a member terminal such as whether the member terminal is a terminal for video, a terminal for information or a terminal for audio information.

In this example, the information showing a compressed pattern for music information includes plural types of patterns, for example in the case of a pattern A, the deterioration of audio information is small, the pattern A is a compressed pattern in which original audio information can be regenerated faithfully and a pattern B is a compressed pattern in which the compressibility of audio information is high.

For the size of a display, in this example, two types of member terminals different in the size of a display can be used, the size of a display area, A denotes a member terminal provided with a display provided with a large display area of 640×200 dots as in the above case referring to FIG. 14 and the size of a display area, B denotes a member terminal provided with a display provided with a small display area of 320×200 dots. The information showing whether color display or monochrome display shows whether a display with which a member terminal is provided is a color display (C) or a monochrome display (BW).

As described above, for example, when the provider of the common server 2 and a user who buys a member terminal make a contract, the member identification information of the member terminal is stored in a memory 21M of the master server 21 of the server 2, however, at this time, a member information table is generated in the memory 21M of the master server 21 of the common server 2 by also storing the category information and function identification information of the above member terminal together.

The common server 2 can identify functions and capacity for processing of a member terminal requesting connection based upon connection request information from each member terminal or member identification information included in the extended header of information from each member terminal by referring to category information and function identification information in the member information table shown in FIG. 19.

In this case, each member terminal is not required to send category information and function identification information showing its own functions and capacity for processing included in connection request information. Therefore, as each member terminal is not required to store category information and function identification information, the load of each member terminal can be further reduced.

As described above, in this example, category information and function identification information are not required to be sent from each member terminal to the common server 2, the member information table shown in FIG. 19 is generated in the common server 2 and can be realized only by modifying a program executed in the common server 2 for identifying functions and capacity for processing of a member terminal.

A member information table is not limited to this and the further detailed information of functions and capacity for processing may be also stored every member terminal. For example, for color display, information related to the number of displayable colors and information such as the resolution of a display may be included.

In the above embodiments, a case that the common server 2 generates display information sent to a member terminal according to the size of a display area of LCD is described and as its concrete example, a case that the number of display columns is varied as shown in FIG. 14 is described, however, the present invention is not limited to these cases. Information supplied to a member terminal can be processed or a display layout can be varied respectively according to functions and capacity for processing of each member terminal and the processed or varied information is sent.

For example, as described above, information such as a character and a symbol can be displayed, however, when information including character information and video information such as a photograph is sent to a member terminal in which so-called video information such as a dynamic image and a static image is disabled, the video information is removed and only the character information can be sent.

Tone quality can be also varied according to functions and capacity for processing of each member terminal in audio information in addition to display information and information the tone quality of which is varied is sent.

Also, for example, for contents information which can be supplied from the common server 2 to each member terminal, information sent every member terminal different in functions and capacity for processing is generated beforehand and when a request for connection is sent from a member terminal, information according to functions and capacity for processing of the member terminal can be also immediately sent.

In the above embodiment, a case that the above portable radiocommunication terminal is provided with a PHS function is described, however, a telephone function may be also a mobile telephone function. In that case, a network for a mobile telephone is used.

Also, in the above embodiment, for an electronic mail and facsimile, data is communicated according to SMTP between the common server 2 and each member terminal 1, however, in the case of an electronic mail and facsimile, communication between the common server 2 and each member terminal 1 is unified by also communicating data according to HTTP as in the case of a WWW browser function and an application program for communication can be simplified.

Means for informing a user of a portable radiocommunication terminal by the information of reception from the common server 2 is not limited to a method using a display mark as in the above embodiment, a bell may be also rung or reception may be also informed by a voice message.

What is claimed is:

1. An information provision system, comprising:
a server; and
an information regeneration terminal, wherein
    said server is connected to a plurality of information providers for providing information via a network,
    said server includes means for generating a channel between said server and said information regeneration terminal in response to a request for connection from said information regeneration terminal, means for receiving a request for provided information and information identifying functions for processing data and/or capacity for processing data of the information regeneration terminal from said information regeneration terminal, and means for acquiring said provided information from an information provider via said network and sending said provided information to said information regeneration terminal via said channel based on the information identifying functions for processing data and/or capacity for processing data of the information regeneration terminal such that the provided information conforms to the functions for processing data and capacity for processing data of the information regeneration terminal, and
    said information regeneration terminal comprising
        means for receiving a user operation for requesting connection, sending a request for connection to said server, and generating said channel between said server and said information regeneration terminal,
        means for sending said request for provided information to said server via said channel based upon a user operation for requesting provided information and sending the information identifying functions for processing data and/or capacity for processing data of the information regeneration terminal, and
        means for acquiring and regenerating said provided information from said server.

2. An information provision system according to claim 1, wherein
    said server includes means for sending information of a list of providable information to said information regeneration terminal via said channel after said server generates said channel is response to said request for connection from said information regeneration terminal,
    said information regeneration terminal includes means for receiving said information of said list of providable information from said server and providing said information to said user, and
    said user operation for requesting said provided information is an operation for selecting information from said list of providable information.

3. An information provision system according to claim 1, wherein
    said information regeneration terminal and said server are connected via a network to which a communication terminal is connected,
    said information regeneration terminal sends to said server said request for connection along with identification information showing that said information regeneration terminal can receive said provided information from said server, and
    said server verifies that said information regeneration terminal can receive said provided information based upon said identification information and sends said provided information to said information regeneration terminal in response to said request for provided information.

4. An information provision system according to claim 3, wherein
    said network to which said information regeneration terminal and said server are connected includes a network for a portable telephone terminal, and said information regeneration terminal is provided with radiocommunication means for communication via a radio base station for said portable telephone terminal.

5. An information provision system according to claim 4, wherein said server is connected to a dedicated network via said network for said portable telephone terminal, and said server is connected to said information provider via a wide area network.

6. An information regeneration terminal to which information is provided from a server via a network, said terminal comprising:

a memory in which address information of said server in said network is stored;

connection request sending means for sending a request for connection addressed to said server via said network using said address information of said server in response to a user operation requesting connection;

channel generating means for generating a channel between said server and said information regeneration terminal;

means for sending a request for provided information to said server via said channel in response to a user operation for requesting said provided information and information identifying functions for processing data and/or capacity for processing data of the information regeneration terminal such that the provided information to be sent from the server conforms to the functions for processing data and/or capacity for processing data of the information regeneration terminal; and means for acquiring and regenerating said provided information from said server via said channel.

7. An information regeneration terminal according to claim 6, wherein said information regeneration terminal is connected to said server via a network to which a communication terminal is connected, and said connection request sending means sends to said server said request for connection along with identification information showing that said information regeneration terminal can receive said provided information from said server.

8. An information regeneration terminal according to claim 6, wherein said channel generated between said server and said information regeneration terminal includes a network for a portable telephone terminal, said information regeneration terminal is provided with radiocommunication means for communicating via a radio base station for said portable telephone terminal, and said information regeneration terminal is portable.

9. A server for providing requested information to an information regeneration terminal, wherein said server is connected to a plurality of information providers for providing information via a network, said server comprising:

means for generating a channel between said server and an information regeneration terminal in response to a request for connection from said information regeneration terminal; and means for acquiring requested provided information from an information provider via said network in response to a request for provided information from said information regeneration terminal and sending said acquired provided information to information regeneration terminal via said channel based on information identifying functions for processing data and/or capacity for processing data of the information regeneration terminal provided by the information regeneration terminal such that the provided information conforms to the functions for processing data and/or capacity for processing data of the information regeneration terminal.

10. A server according to claim 9, wherein said server is connected to said information regeneration terminal via said network to which a communication terminal is connected, said server checks whether said information with radiocommunication means for communicating via a radio base station for said portable telephone terminal, and said information regeneration terminal is portable.

11. An information communication method in which a server and a portable radiocommunication terminal are connected via a network by a wireless connection, said portable radiocommunication terminal sends information specifying a party in cooperation with said server, and receive data sent to said portable radiocommunication terminal is received by said server, stored in storage means of said server, and acquired by said portable radiocommunication terminal when said portable radiocommunication terminal requests said server to send said receive data, said method comprising the steps of:

said server executing a process for sending or receiving information to/from said party; and communicating send information and receive information between said portable radiocommunication terminal and said server according to a communication system suitable for said network based on information identifying functions for processing data and/or capacity for processing data of the portable radiocommunication terminal provided by the portable radiocommunication terminal such that the information received by the portable radiocommunication terminal from the server conforms to the functions for processing data and/or capacity for processing data of the portable radiocommunication terminal.

12. A server which is connected to a plurality of portable radiocommunication terminals via a network by a wireless connection and for enabling each of said plurality of portable radiocommunication terminals to acquire received information addressed to its own terminal in cooperation with each of said plurality of portable radiocommunication terminals, said server comprising:

received information storing means for storing received information addressed to each of said plurality of portable radiocommunication terminals;

means for receiving a request to acquire related information related to said received information and information identifying functions for processing data and/or capacity for processing data of a portable radiocommunication terminal sent from the portable radiocommunication terminal, generating related information based upon said received information stored in said storage means and addressed to said portable radiocommunication which sent said request to acquire and sending said generated related information to said portable radiocommunication terminal which sent said request to acquire based on the information identifying functions for processing data and/or capacity for processing data of the portable radiocommunication terminal such that the general related information conforms to the functions for processing data and/or capacity for processing data of the portable radiocommunication terminal; and means for receiving a request to process related information related to said received information sent from said portable radiocommunication terminal, processing said related information according to said request to process and sending said processed related information to said portable radiocommunication terminal which sent said request to process.

13. A server according to claim 12, wherein said server executes processing for enabling each of said portable radiocommunication terminals to send information specifying another party according to an established communication system in cooperation with each of said plurality of portable radiocommunication terminals.

14. An information communication method in which a server and a plurality of portable radiocommunication terminals are connected via a network by a wireless connection and said server provides data communication service in response to a request from each of said portable radiocommunication terminals, comprising the steps of:

each of said portable radiocommunication terminals sending to said server performance identification information for identifying functions for processing and/or a capacity for processing of a respective portable radiocommunication terminal; and said server identifying said functions for processing and said capacity for processing of each of said portable radiocommunication terminals based upon said performance identification information sent from each of said portable radiocommunication terminals and generating information to be sent to each of said portable radiocommunication terminals based upon an identification result such that the information to be sent to each of said portable radiocommunication terminals conforms to the functions for processing and/or capacity for processing of each of said plurality of portable radiocommunication terminals.

15. An information communication method in which a server and a plurality of portable radiocommunication terminals are connected via a network by a wireless connection and said server provides data communication service in response to a request from each of said portable radiocommunication terminals comprising the steps of:

said server storing terminal related information generated by relating identification information sent from said plurality of portable radiocommunication terminals connected to said server via said network and information showing functions for processing and/or a capacity for processing of each of said portable radiocommunication terminals; and said server referring to said terminal related information based upon said identification information sent from said plurality of portable radiocommunication terminals, identifying said functions for processing and/or said capacity for processing of each of said portable radiocommunication terminals, and generating information to be sent to each of said portable radiocommunication terminals based upon an identification result such that the information to be sent to each of said portable radiocommunication terminals conforms to the functions for processing and/or capacity for processing of each of said plurality of portable radiocommunication terminals.

16. An information communication system in which a server and a plurality of portable radiocommunication terminals are connected via a network by a wireless connection and said server provides data communication service in response to a request from each of said portable radiocommunication terminals, said system comprising:

a portable radiocommunication terminal, comprising:

storage means for storing performance identification information for identifying functions for processing and/or a capacity for processing of said portable radiocommunication terminal, reading means for reading said performance identification information from said storage means, and performance identification information sending means for sending said performance identification information read by said reading means to said server; and a server, comprising:

performance identifying means for identifying said functions for processing and/or said capacity for processing of said portable radiocommunication terminal based upon said performance identification information from said portable radiocommunication terminals, send information generating means for generating send information to be sent to said portable radiocommunication terminal based upon an identification result from said performance identifying means such that the send information conforms to the functions for processing data and/or capacity for processing data of the portable radiocommunication terminal, and sending means for sending said send information generated by said send information generating means to said portable radiocommunication terminal.

17. An information communication system in which a server and a plurality of portable radiocommunication terminals are connected via a network by a wireless connection and said server provides data communication service in response to a request from each of said portable radiocommunication terminals, said system comprising:

a server, comprising:

terminal related information storing means for storing terminal related information generated by relating identification information sent from each of said portable radiocommunication terminals connected to said server via said network and information showing at least functions for processing and/or a capacity for processing of said portable radiocommunication terminals, performance identifying means for referring to said terminal related information stored in said terminal related information storing means based upon said identification information sent from said portable radiocommunication terminals and identifying at least said functions for processing and/or said capacity for processing of said portable radiocommunication terminals;

send information generating means for generating send information to be sent to each of said portable radiocommunication terminals based upon an identification result from said performance identifying means such that the send information to be sent to each of said portable radiocommunication terminals conforms to the functions for processing and/or capacity for processing of each of said plurality of portable radiocommunication terminals; and sending means for sending said send information generated by said send information generating means to said each of said portable radiocommunication terminals.

18. A portable radiocommunication terminal connected to a server via a network by a wireless connection and to which information according to one of functions for processing and/or capacity for processing of said portable radiocommunication terminal is provided from said server, said portable radiocommunication terminal comprising:

storage means for storing performance identification information for identifying one of said functions for processing and said capacity for processing which said portable radiocommunication terminal is provided;

reading means for reading said performance identification information from said storage means; and performance identification information sending means for sending said performance identification information read by said reading means to said server such that information to be sent to said portable radiocommunication terminal from said server conforms to the functions for processing and/or capacity for processing of said portable radiocommunication terminal.

19. A server connected to a portable radiocommunication terminal via a network by a wireless connection for generating information relating to said portable radiocommunication terminal and providing said information to said portable radiocommunication terminal, said server comprising:

performance identifying means for identifying one of functions for processing and/or a capacity for processing of said portable radiocommunication terminal based upon performance identification information sent from said portable radiocommunication terminal;

send information generating means for generating send information to be sent to said portable radiocommunication terminal based upon an identification result of said performance identifying means such that the information to be sent to said portable radiocommunication terminal conforms to the functions for processing and/or capacity for processing of said portable radiocommunication terminal; and sending means for sending said send information generated by said send information generating means to said portable radiocommunication terminal.

20. A server connected to a portable radiocommunication terminal via a network by a wireless connection for generating information relating to said portable radiocommunication terminal and providing said information to said portable radiocommunication terminal, said server comprising:

storing means for storing terminal-related information generated by relating identification information sent from a portable radiocommunication terminal connected to said server via said network and information showing one of functions for processing and a capacity for processing which said portable radiocommunication terminal is provided;

performance identifying means for referring to said terminal-related information stored in said storing means based upon said identification information sent from said portable radiocommunication terminal and identifying one of said functions for processing and said capacity for processing which said portable radiocommunication terminal is provided;

send information generating means for generating send information sent to said portable radiocommunication terminal based upon an identification result by said performance identifying means such that the send information to be sent to said portable radiocommunication terminal conforms to the functions for processing and/or capacity for processing of said portable radiocommunication terminal; and sending means for sending said send information generated by said send information generating means to said portable radiocommunication terminal.

21. A portable radiocommunication terminal connected to a server via a network by a wireless connection and to which information according to processing functions thereof is provided from said server, said portable radiocommunication terminal comprising:

storage means for storing identification information for identifying one of said functions with which said portable radiocommunication terminal is provided;

reading means for reading said identification information from said storage means;

display means for displaying said identification information read from said storage means for subsequent selections; and identification information sending means for sending selected identification information to said server such that information to be sent to said portable radiocommunication terminal from the server conforms to the functions with which the portable radiocommunication terminal is provided.

22. A portable radiocommunication terminal connected by a wireless connection to a server via a network and to which information relating to processing functions thereof is provided, said portable radiocommunication terminal comprising:

storage means for storing identification information for identifying said processing functions with which said portable radiocommunication terminal is provided;

reading means for reading out said identification information from said storage means;

display means for displaying said identification information read out from said storage means;

selecting means for permitting a user to make a selection from said identification information being displayed; and identification information sending means for sending the selected identification information to said server such that the information to be sent to said portable radiocommunication terminals from the server conforms to the processing functions of said portable radiocommunication terminal.

* * * * *